(12) United States Patent
Akiyama

(10) Patent No.: US 12,512,528 B2
(45) Date of Patent: Dec. 30, 2025

(54) ELECTRICAL STORAGE DEVICE

(71) Applicant: KABUSHIKI KAISHA TOYOTA JIDOSHOKKI, Kariya (JP)

(72) Inventor: Hirokuni Akiyama, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 723 days.

(21) Appl. No.: 17/775,152

(22) PCT Filed: Oct. 29, 2020

(86) PCT No.: PCT/JP2020/040672
§ 371 (c)(1),
(2) Date: May 6, 2022

(87) PCT Pub. No.: WO2021/095551
PCT Pub. Date: May 20, 2021

(65) Prior Publication Data
US 2022/0393265 A1 Dec. 8, 2022

(30) Foreign Application Priority Data

Nov. 13, 2019 (JP) .................................. 2019-205521
Jan. 9, 2020 (JP) .................................. 2020-002377

(51) Int. Cl.
*H01M 10/655* (2014.01)
*H01M 10/0585* (2010.01)
*H01M 10/613* (2014.01)
*H01M 10/625* (2014.01)
*H01M 50/183* (2021.01)
*H01M 50/60* (2021.01)

(52) U.S. Cl.
CPC ..... *H01M 10/655* (2015.04); *H01M 10/0585* (2013.01); *H01M 10/613* (2015.04);
(Continued)

(58) Field of Classification Search
CPC ............. H01M 10/655; H01M 10/613; H01M 10/625; H01M 50/60; H01M 50/183; H01M 10/0585; H01M 2220/20
See application file for complete search history.

(56) References Cited

U.S. PATENT DOCUMENTS

2003/0082439 A1* 5/2003 Sakakibara ....... H01M 10/6235
429/120
2005/0260493 A1* 11/2005 Frederiksson .......... H01M 4/80
29/623.2
(Continued)

FOREIGN PATENT DOCUMENTS

CN 109929650 A * 6/2019
JP 2010-198933 A 9/2010
(Continued)

OTHER PUBLICATIONS

International Search Report for PCT/JP2020/040672 dated Dec. 28, 2020.
(Continued)

*Primary Examiner* — Brian R Ohara
*Assistant Examiner* — Emily Elizabeth Freeman
(74) *Attorney, Agent, or Firm* — Sughrue Mion, PLLC

(57) ABSTRACT

A power storage device includes: a modular structure including at least one power storage module, the power storage module having an electrode stacked body and a sealing member, the electrode stacked body having bipolar electrodes, and the sealing member sealing a side surface of the electrode stacked body; a pair of restraint members disposed at both ends of the modular structure in the first direction to apply a restraint load to the modular structure; and a first intermediate member interposed between the restraint member and the modular structure to transmit the restraint load from the restraint member to the modular structure, wherein
(Continued)

the first intermediate member includes a first package that is deformable according to the restraint load and a fluid that is enclosed in the first package.

15 Claims, 11 Drawing Sheets

(52) U.S. Cl.
CPC ....... *H01M 10/625* (2015.04); *H01M 50/183* (2021.01); *H01M 50/60* (2021.01); *H01M 2220/20* (2013.01)

(56) References Cited

U.S. PATENT DOCUMENTS

| | | | | |
|---|---|---|---|---|
| 2007/0218340 | A1* | 9/2007 | Akiyama | H01M 8/04089 429/513 |
| 2018/0366697 | A1* | 12/2018 | Elfering | H01M 50/516 |
| 2019/0044117 | A1* | 2/2019 | Templeman | H01M 50/262 |
| 2019/0319254 | A1* | 10/2019 | Tsuchida | H01M 4/366 |
| 2020/0350522 | A1* | 11/2020 | Choi | H01M 10/66 |

FOREIGN PATENT DOCUMENTS

| | | |
|---|---|---|
| JP | 2010-238424 A | 10/2010 |
| JP | 2013-37946 A | 2/2013 |
| JP | 2014-203743 A | 10/2014 |
| JP | 2019-21382 A | 2/2019 |
| JP | 2019-129031 A | 8/2019 |

OTHER PUBLICATIONS

International Preliminary Report on Patentability dated May 17, 2022 with a Translation of the Written Opinion of the International Searching Authority in Application No. PCT/JP2020/040672.

* cited by examiner

ELECTRICAL STORAGE DEVICE

TITLE OF THE INVENTION

CROSS REFERENCE TO RELATED APPLICATIONS

This application is a National Stage of International Application No. PCT/JP2020/040672 filed Oct. 29, 2020, claiming priorities based on Japanese Patent Application No. 2019-205521 filed Nov. 13, 2019 and Japanese Patent Application No. 2020-002377 filed Jan. 9, 2020.

TECHNICAL FIELD

The present disclosure relates to a power storage device.

BACKGROUND ART

Patent Literature 1 describes a power storage device. This power storage device is provided with a module stacked body that includes a plurality of power storage modules stacked on each other and a restraint member that applies a restraint load to the module stacked body. The restraint member is constituted by a pair of end plates that sandwich the module stacked body therebetween in a stacking direction and bolts and nuts that fasten the end plates to each other. Insertion holes are provided in an edge portion of each of the end plates at positions outside the module stacked body. The bolts are passed from the insertion holes of one end plate to the insertion holes of the other end plate, and the nuts are screwed onto tip end portions of the bolts protruding from the insertion holes of the other end plate. As a result, the module stacked body is sandwiched between the end plates, and a restraint load is applied thereto.

CITATION LIST

Patent Literature

[Patent Literature 1] Japanese Unexamined Patent Publication No. 2019-129031

SUMMARY OF INVENTION

Technical Problem

In the above-mentioned power storage device, insulation between the end plate and the module stacked body is achieved by providing a film having an electrical insulation property on a surface of the end plate on a side of the module stacked body. Therefore, in the above-mentioned power storage device, the restraint load from the end plate is applied to the module stacked body via the film.

On the other hand, the bolts for fastening the pair of end plates to each other are disposed at the edge portion of each of the end plates. Therefore, when the restraint load is applied to the module stacked body, the end plates may be deformed such that the edge portions of the pair of end plates bend toward each other. Therefore, in the above technical field, it may be required for the restraint load to be able to be uniformly applied to the power storage module even in a case where the restraint member such as the end plate is deformed.

Therefore, an object of the present disclosure is to provide a power storage device capable of uniformly applying a restraint load to a power storage module even in a case where a restraint member is deformed.

Solution to Problem

The present inventor has obtained the following findings by proceeding with diligent study in order to solve the above problem. That is, in a case where an intermediate member made of a single elastic member such as rubber or sponge is interposed between a restraint member and a modular structure including a power storage module, the intermediate member is compressed with a different amount of compression for each position depending on an amount of deformation of the restraint member. As a result, the restraint load to the modular structure may vary depending on the position. On the other hand, if an intermediate member configured by enclosing a fluid such as a liquid or a gas in a package that can be deformed according to a restraint load is used, even if the intermediate member is compressed with a different amount of compression for each position, a pressure inside the package is kept constant. As a result, it is possible to uniformly apply a restraint load to the power storage module. The present disclosure has been completed based on the above findings.

That is, a power storage device according to the present disclosure includes: a modular structure including at least one power storage module, the power storage module having an electrode stacked body and a sealing member, the electrode stacked body having a plurality of bipolar electrodes, the plurality of bipolar electrodes each including a current collector, a positive electrode layer provided on one main surface of the current collector, and a negative electrode layer provided on the other main surface of the current collector and being stacked in a first direction, and the sealing member sealing a side surface of the electrode stacked body along the first direction; a pair of restraint members disposed at both ends of the modular structure in the first direction to apply a restraint load to the modular structure; and a first intermediate member interposed between the restraint member and the modular structure to transmit the restraint load from the restraint member to the modular structure, wherein the first intermediate member includes a first package that is deformable according to the restraint load and a fluid that is enclosed in the first package.

In the power storage device, the restraint load is applied to the modular structure from the pair of restraint members disposed at both ends thereof. The first intermediate member to transmit the restraint load from the restraint member to the modular structure is disposed between the restraint member and the modular structure. The first intermediate member includes the first package that is deformable according to the restraint load and the fluid that is enclosed in the first package. Therefore, as described above, even if the first intermediate member is compressed with a different amount of compression for each position according to the deformation of the restraint member, a pressure inside the first package is kept constant. As a result, it is possible to uniformly apply the restraint load to the power storage module.

In the power storage device according to the present disclosure, the modular structure may further include a current collecting plate that constitutes one end of the modular structure in the first direction and is electrically connected to the electrode stacked body, and the first intermediate member may be interposed between the restraint member and the current collecting plate such that an outer edge of the first intermediate member is located outside an outer edge of the current collecting plate when viewed in the first direction. In this case, when a restraint load is applied to the modular structure, a portion of the first intermediate member overlapping the current collecting plate is compressed, and a portion of the first intermediate member located outside the current collecting plate is deformed toward the current collecting plate to cover an edge of the current collecting plate. As a result, the movement of the first intermediate member is restricted by the edge of the current collecting plate, and thus the displacement between the first intermediate member and the modular structure is suppressed.

In the power storage device according to the present disclosure, in the one end of the modular structure, the sealing member may be disposed outside the current collecting plate to surround the current collecting plate when viewed in the first direction, and the first intermediate member may be disposed from the current collecting plate to the sealing member. In this case, the restraint load can be uniformly applied to the sealing member in addition to the power storage module.

In the power storage device according to the present disclosure, the outer edge of the first intermediate member may be located outside an outer edge of the sealing member disposed outside the current collecting plate when viewed in the first direction. In this case, when a restraint load is applied to the modular structure as described above, a portion of the first intermediate member overlapping the current collecting plate and the sealing member is compressed, and a portion of the first intermediate member located outside the sealing member is deformed toward the sealing member to cover an edge of the sealing member. As a result, the movement of the first intermediate member is restricted by the edge of the sealing member, and thus the displacement between the first intermediate member and the modular structure is suppressed.

In the power storage device according to the present disclosure, the modular structure may further include a current collecting plate that constitutes one end of the modular structure in the first direction and is electrically connected to the electrode stacked body, and the first intermediate member may be interposed between the restraint member and the current collecting plate such that an outer edge of the first intermediate member is located inside an outer edge of the current collecting plate when viewed in the first direction. In this case, since the first package of the first intermediate member is not in contact with the edge of the current collecting plate, damage to the first package is suppressed.

The power storage device according to the present disclosure may further include at least one of a first adhesive layer disposed between the first intermediate member and the modular structure to adhere the first intermediate member and the modular structure to each other and a second adhesive layer disposed between the first intermediate member and the restraint member to adhere the first intermediate member and the restraint member to each other. In this case, even if the first intermediate member having the first package that can be deformed as described above is used, the displacement between the restraint member and the modular structure is suppressed.

The power storage device according to the present disclosure may further include a seal member provided between the first intermediate member and the modular structure along an outer edge of the first intermediate member or an outer edge of the modular structure. In this case, since the entering of moisture or the like between the first intermediate member and the modular structure is suppressed, the generation of rust and the like in the modular structure is suppressed.

The power storage device according to the present disclosure may further include a fastening member for applying the restraint load to the modular structure via the restraint members by fastening the restraint members to each other. In this case, even if the restraint member is deformed, the restraint load can be uniformly applied to the power storage module.

The power storage device according to the present disclosure may include a case configured to accommodate the modular structure, wherein the case may have a bottomed box-shaped main body portion provided with an opening portion that is open in the first direction and a lid portion that closes the opening portion, and wherein the pair of restraint members may be constituted by a bottom wall portion of the main body portion facing the opening portion in the first direction and the lid portion. Further, the restraint load may be applied to the modular structure via the bottom wall portion and the lid portion by reducing a pressure inside the case with respect to atmospheric pressure. In this case, the restraint load can be uniformly applied to the power storage module. Further, the influence of vibration on the modular structure or swell of the lid portion can be sufficiently alleviated by the first intermediate member.

In the power storage device according to the present disclosure, the lid portion may be constituted by a panel member of a vehicle. In this case, the influence of swell of a panel member of a vehicle on the modular structure can be sufficiently alleviated by the first intermediate member.

The power storage device according to the present disclosure may further include a second intermediate member interposed between the side surface of the modular structure extending in the first direction and an inner surface of the main body portion of the case, wherein the second intermediate member may be constituted by a second package that can be expanded according to filling with contents and a shock absorbing material filled in the second package. Therefore, after the second package in a shrunk state is disposed between the side surface of the modular structure and the inner surface of the main body portion, the second package is filled with the shock absorbing material and the second package is expanded. As a result, the second intermediate member can be disposed between the side surface of the modular structure and the inner surface of the main body portion without a gap. Therefore, in the power storage device, the influence of vibration on the modular structure can be sufficiently alleviated by the second intermediate member.

In the power storage device according to the present disclosure, the modular structure may include a plurality of the power storage modules stacked in the first direction and a heat exchanger disposed between the power storage modules adjacent to each other in the first direction, and the second intermediate member may be interposed between at least the power storage module and the heat exchanger and the inner surface of the main body portion. In this case, the influence of vibration on main constituent elements of the modular structure can be sufficiently alleviated.

In the power storage device according to the present disclosure, the second package may be made of a material having an electrical insulation property. In this case, the electrical insulation property between the modular structure and the main body portion can be ensured by the interposition of the second intermediate member. Since it is not necessary to dispose another insulating member for the insulation between the modular structure and the main body portion, a device configuration can be simplified.

In the power storage device according to the present disclosure, the case may be a case for airtightly accommodating the modular structure, and in the case, a wall portion constituting the inner surface may be provided with a pressure release valve at a position not in contact with the second intermediate member. In this case, the pressure release valve operates in a case where the internal pressure of the case increases when the power storage module is deteriorated or abnormal, and the pressure inside the case can be alleviated. By providing the pressure release valve at a position not in contact with the second intermediate member, it is possible to prevent the pressure alleviation by the pressure release valve from being hindered by the second intermediate member.

In the power storage device according to the present disclosure, the second package may be made of a material that can be broken by a gas generated from the power storage module when the power storage module deteriorates or is abnormal, and the second package may be filled with an ignition inhibitor together with the shock absorbing material. In this case, the second package is broken by the gas generated from the power storage module when the power storage module deteriorates or is abnormal, and the gas can be brought into contact with the ignition inhibitor in the second package. Therefore, the safety of the power storage device can be enhanced.

Advantageous Effects of Invention

According to the present disclosure, it is possible to provide a power storage device capable of uniformly applying a restraint load to a power storage module even in a case where a restraint member is deformed.

DESCRIPTION OF EMBODIMENTS

First Embodiment

Figure 1:
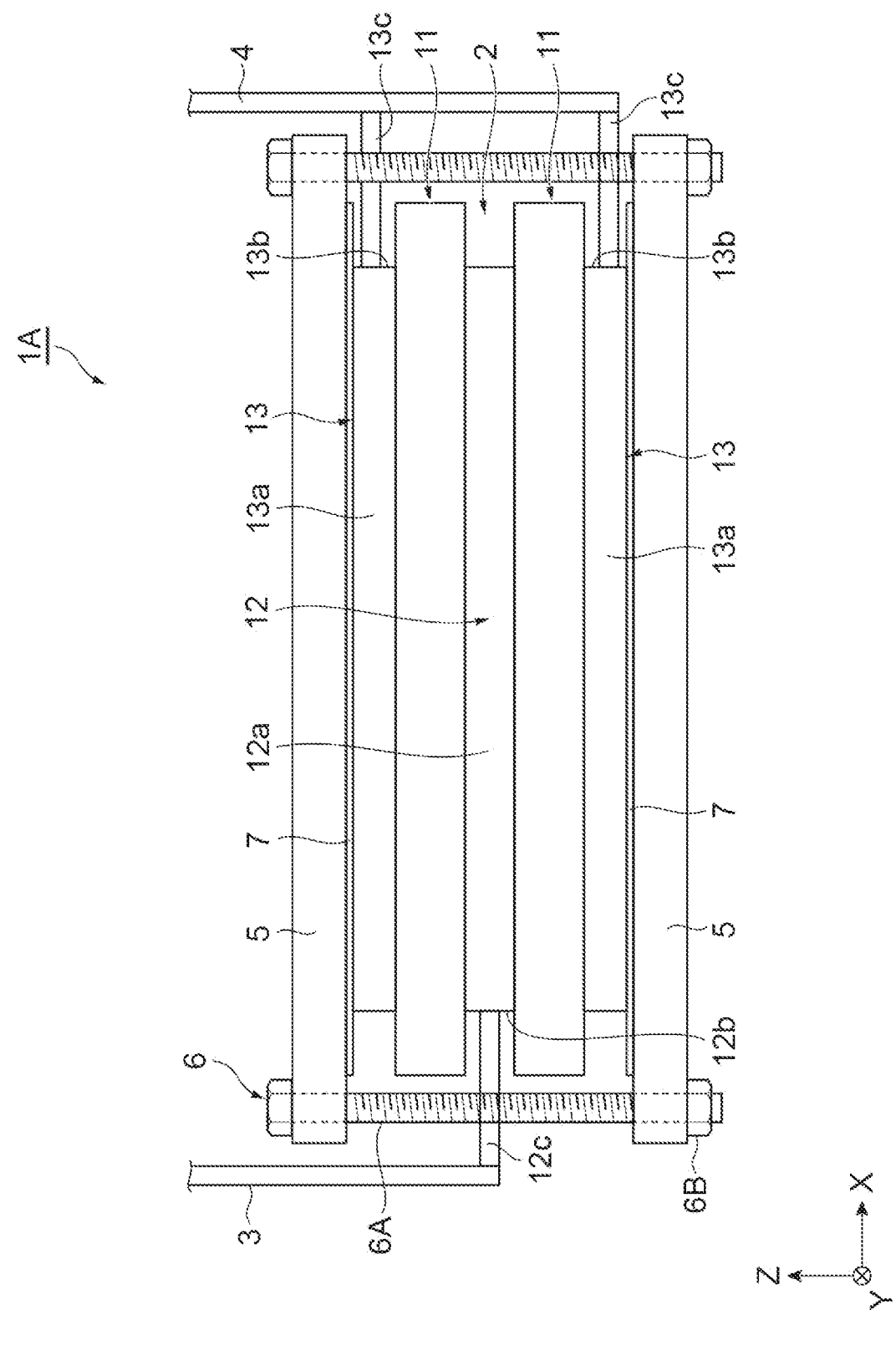
FIG. 1 is a schematic side view showing a power storage device according to a first embodiment.
Figure 2:
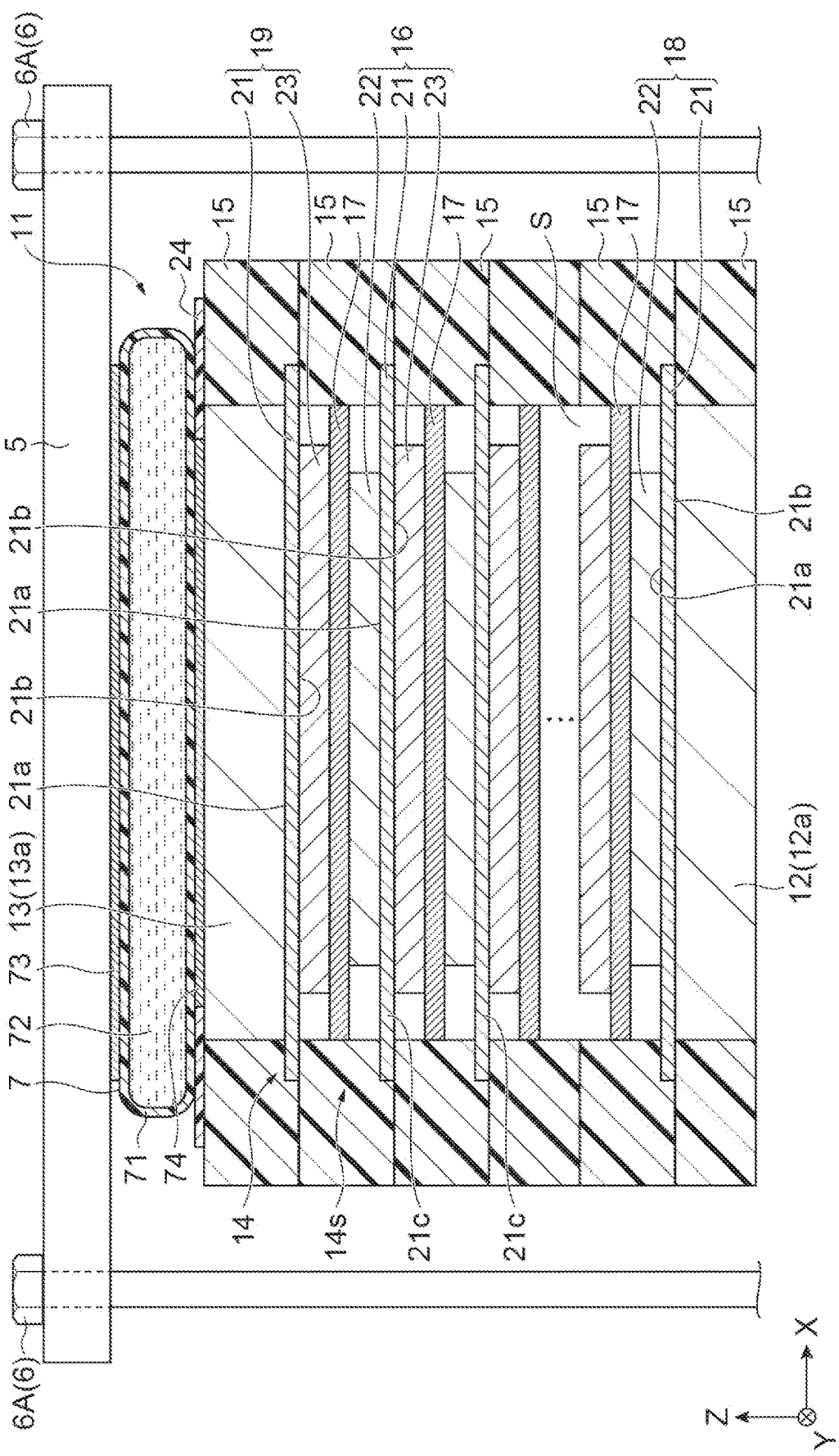
FIG. 2 is a schematic cross-sectional view of a power storage module shown in FIG. 1.

Hereinafter, a first embodiment will be described in detail with reference to FIGS. 1 and 2. In the description of FIGS. 1 and 2, the same or equivalent elements may be designated by the same reference signs, and duplicate description may be omitted. Further, FIGS. 1 and 2 show a Cartesian coordinate system defined by an X-axis, a Y-axis, and a Z-axis. A Z-axis direction is a vertical direction as an example, and an X-axis direction and a Y-axis direction are horizontal directions as an example.

FIG. 1 is a schematic side view showing a power storage device according to a first embodiment. A power storage device 1A shown in FIG. 1 can be used as a battery for various vehicles such as forklifts, hybrid vehicles, and electric vehicles. The power storage device 1A includes a stacked body (a modular structure) 2, connecting members 3 and 4 electrically connected to the stacked body 2, a pair of restraint plates (restraint members) 5 for constraining the stacked body 2 (for adding a restraint load to the stacked body 2), a fastening member 6 that fastens the restraint plates 5 to each other, and an intermediate member (a first intermediate member) 7 disposed between the stacked body 2 and each of the restraint plates 5.

The stacked body 2 includes a plurality of power storage modules 11 stacked in the Z-axis direction (a first direction) and a positive electrode current collecting plate (a current collecting plate) 12 and a negative electrode current collecting plate (a current collecting plate) 13 provided in contact with the power storage module 11. In the following description, the Z-axis direction may be simply referred to as a "stacking direction." Here, the stacked body 2 has two power storage modules 11. The positive electrode current collecting plate 12 is disposed between the power storage modules 11 adjacent to each other. The negative electrode current collecting plate 13 is disposed at both ends of the stacked body 2 in the stacking direction. In other words, the negative electrode current collecting plate 13 constitutes both ends of the stacked body 2 in the stacking direction. The negative electrode current collecting plate 13 is electrically connected to an electrode constituting the power storage module 11. The intermediate member 7 is interposed between each of the negative electrode current collecting plates 13 and the restraint plate 5.

The connecting member 3 is a conductive member (a bus bar) that functions as a positive electrode of the power storage device 1A. The connecting member 3 is provided in the stacking direction as an example. The connecting member 3 is, for example, a metal plate or an alloy plate. Examples of a material of the metal plate include copper, aluminum, titanium, nickel, and the like. Examples of a material of the alloy plate include a stainless steel plate (SUS 301, SUS 304, and the like) and an alloy of the material of the metal plate. The connecting member 3 is electrically connected to the positive electrode current collecting plate 12 (here, one).

The connecting member 4 is a conductive member (a bus bar) that functions as a negative electrode of the power storage device 1A. The connecting member 4 is provided in the stacking direction as an example. The connecting member 4 may be a metal plate or an alloy plate made of the same material as the metal plate or the alloy plate of the connecting member 3, or may be a metal plate or an alloy plate made of a material different from that of the metal plate or the alloy plate of the connecting member 3. The connecting member 4 is electrically connected to the negative electrode current collecting plate 13 (here, two).

At least one of the connecting members 3 and 4 may be provided with heat radiation fins (not shown) or the like having excellent thermal conductivity. In this case, the heat generated in the power storage module 11 can be effectively dissipated to the outside of the power storage module 11 via the positive electrode current collecting plate 12, the negative electrode current collecting plate 13, the connecting members 3 and 4, and the heat radiation fins.

The restraint plates 5 are disposed at both ends of the stacked body 2 in the stacking direction. Each of the restraint plates 5 may be made of, for example, a conductive metal (for example, a metal such as copper, aluminum, titanium, or nickel, an alloy containing these metals, or an alloy such as stainless steel). The fastening member 6 includes, for example, a bolt 6A and a nut 6B and applies a restraint load to the stacked body 2 via the restraint plates 5 by fastening the restraint plates 5 to each other. Each of the restraint plates 5 has a through hole through which the bolt 6A is inserted.

Each of the intermediate members 7 has, for example, an insulation property as a whole. Here, each of the intermediate members 7 is in contact with the negative electrode current collecting plate 13.

That is, here, the power storage modules 11 are arranged such that negative electrode termination electrodes 19 coated with an active material layer to be a negative electrode layer 23, which will be described later, are disposed at both ends of the stacked body 2 in the stacking direction. A specific configuration of the intermediate member 7 will be described later.

Next, the details of the power storage module 11 will be described with reference to FIG. 2. FIG. 2 is a schematic cross-sectional view showing a part of the power storage device shown in FIG. 1 in an enlarged manner. FIG. 2 mainly shows one of the two power storage modules 11 shown in FIG. 1. As shown in FIG. 2, the power storage module 11 is a unit battery having a substantially rectangular parallelepiped shape. The power storage module 11 is, for example, a secondary battery such as a nickel hydrogen secondary battery or a lithium ion secondary battery. The power storage module 11 may be an electrical double layer capacitor. The power storage module 11 may be an all solid state battery.

Here, the power storage module 11 is a bipolar type lithium ion secondary battery. The power storage module 11 is sandwiched between the positive electrode current collecting plate 12 and the negative electrode current collecting plate 13 in the stacking direction, is electrically connected to the connecting member 3 via the positive electrode current collecting plate 12, and is electrically connected to the connecting member 4 via the negative electrode current collecting plate 13.

The power storage module 11 includes a stacked body (an electrode stacked body) 14 and a sealing member 15. The stacked body 14 has a plurality of bipolar electrodes (electrodes) 16, a plurality of separators 17, a positive electrode termination electrode (an electrode) 18, and a negative electrode termination electrode (an electrode) 19. Here, the plurality of bipolar electrodes 16 are stacked in the Z-axis direction. As described above, here, the stacking direction of the bipolar electrodes 16 and the stacking direction of the power storage modules 11 coincide with each other, and thus the stacking direction of the bipolar electrodes 16 may also be simply referred to as the "stacking direction" below. The stacked body 14 has a side surface 14s in the stacking direction.

The positive electrode termination electrode 18 is stacked on the bipolar electrode 16 at one end of the stacked body 14 in the stacking direction. The negative electrode termination electrode 19 is stacked on the bipolar electrode 16 at the other end of the stacked body 14 in the stacking direction. The separator 17 is interposed between the bipolar electrodes 16 adjacent to each other, between the bipolar electrode 16 and the positive electrode termination electrode 18, or between the bipolar electrode 16 and the negative electrode termination electrode 19.

The bipolar electrode 16 has an electrode plate (a current collector) 21, a positive electrode layer (an electrode layer) 22, and a negative electrode layer (an electrode layer) 23. The electrode plate 21 includes a pair of main surfaces $21a$ and $21b$ that intersect in the stacking direction. The main surface $21a$ is provided with the positive electrode layer 22, and the main surface $21b$ is provided with the negative electrode layer 23. That is, the bipolar electrode 16 includes electrode layers formed on both surfaces of the electrode plate 21. The electrode plate 21 is sandwiched between the positive electrode layer 22 and the negative electrode layer 23 in the stacking direction. The bipolar electrode 16 may be formed by overlapping an electrode plate 21 having a positive electrode layer 22 formed on one surface thereof and another electrode plate 21 having a negative electrode layer 23 formed on one surface thereof each other such that surfaces on which the electrode layer is not formed are in contact with each other.

The electrode plate 21 is a sheet-shaped conductive member and has a substantially rectangular shape. The electrode plate 21 is, for example, a metal foil or an alloy foil. The metal foil is, for example, a copper foil, an aluminum foil, a titanium foil, a nickel foil, or the like. The alloy foil is, for example, a stainless steel foil (for example, SUS 304, SUS 316, SUS 301, or the like specified in JIS G 4305: 2015), an alloy foil containing a plated steel sheet (for example, a cold rolled steel sheet (SPCC or the like) specified in JIS G 3141: 2005), a plated stainless steel sheet, or a metal material used for the above metal foil, or the like. In a case where the electrode plate 21 is an alloy foil, or in a case where the electrode plate 21 is a metal foil other than an aluminum foil, a surface of the electrode plate 21 may be coated with aluminum. A thickness of the electrode plate 21 is, for example, 5 μm or more and 70 μm or less.

The positive electrode layer 22 is a layered member containing a positive electrode active material, a conductive auxiliary agent, and a binder and has a substantially rectangular shape. The positive electrode active material of the present embodiment is, for example, a complex oxide, metallic lithium, sulfur, and the like. The composition of the complex oxide includes, for example, at least one of iron, manganese, titanium, nickel, cobalt, and aluminum, as well as lithium. Examples of the complex oxide include olivine-type lithium iron phosphate ($LiFePO_4$). The binder serves to bind the active material or the conductive auxiliary agent to a surface of the current collector and maintain a conductive network in the electrode.

Examples of the binder include fluorine-containing resins such as polyvinylidene fluoride, polytetrafluoroethylene, and fluororubber, thermoplastic resins such as polypropylene and polyethylene, imide resins such as polyimide and polyamideimide, alkoxysilyl group-containing resins, acrylic resins such as a polyacrylic acid and a polymethacrylic acid, styrene-butadiene rubber (SBR), carboxymethyl cellulose, alginates such as sodium alginate and ammonium alginate, water-soluble cellulose ester cross-linked bodies, and starch-acrylic acid graft polymers. These binders may be used alone or in combinations of two or more. The conductive auxiliary agent is, for example, acetylene black, carbon black, graphite, or the like. A viscosity adjusting solvent is, for example, N-methyl-2-pyrrolidone (NMP) or the like.

The negative electrode layer 23 is a layered member containing a negative electrode active material, a conductive auxiliary agent, and a binder and has a substantially rectangular shape. The negative electrode active material of the present embodiment is, for example, graphite, artificial graphite, highly oriented graphite, mesocarbon microbeads, carbon (hard carbon, soft carbon, or the like), a metal compound, an element that can be alloyed with lithium or a compound thereof, boron-added carbon, or the like. Examples of the element that can be alloyed with lithium include silicon and tin. As the conductive auxiliary agent and the binder of the negative electrode layer 23, the same ones as those of the positive electrode layer 22 can be used.

The positive electrode termination electrode 18 includes an electrode plate 21 and a positive electrode layer 22 formed on one main surface 21a of the electrode plate 21. In the positive electrode termination electrode 18, an electrode layer such as the positive electrode layer 22 or the negative electrode layer 23 is not formed on the other main surface 21b of the electrode plate 21. The positive electrode termination electrode 18 is stacked on the bipolar electrode 16 such that one main surface 21a of the electrode plate 21 and the positive electrode layer 22 face a side of the bipolar electrode 16 (the inside of the stacked body 14).

The negative electrode termination electrode 19 includes an electrode plate 21 and a negative electrode layer 23 formed on the other main surface 21b of the electrode plate 21. In the negative electrode termination electrode 19, an electrode layer such as the positive electrode layer 22 or the negative electrode layer 23 is not formed on the other main surface 21b of the electrode plate 21. The negative electrode termination electrode 19 is stacked on the bipolar electrode 16 such that the other main surface 21b of the electrode plate 21 and the negative electrode layer 23 face a side of the bipolar electrode 16 (the inside of the stacked body 14).

The separator 17 is a layered member that separates the adjacent bipolar electrodes 16 from each other, the bipolar electrode 16 and the positive electrode termination electrode 18 from each other, or the bipolar electrode 16 and the negative electrode termination electrode 19 from each other and has a substantially rectangular shape. The separator 17 is a member that prevents a short circuit between the adjacent bipolar electrodes 16, between the bipolar electrode 16 and the positive electrode termination electrode 18, or between the bipolar electrode 16 and the negative electrode termination electrode 19. The separator 17 is configured to contain an electrolyte which is contained in the positive electrode layer 22 and the negative electrode layer 23. In a case where the separator 17 is made of a solid state electrolyte, the separator 17 may have a substantially rectangular plate shape. A thickness of the separator 17 is, for example, 1 μm or more and 20 μm or less.

The separator 17 may be, for example, a porous film made of a polyolefin resin such as polyethylene (PE) or polypropylene (PP) containing an electrolyte. The separator 17 may be a woven fabric made of polypropylene, methyl cellulose, or the like, or a non-woven fabric containing an electrolyte. The separator 17 may be reinforced with a vinylidene fluoride resin compound.

The sealing member 15 is a member that holds the plurality of bipolar electrodes 16, the plurality of separators 17, the positive electrode termination electrode 18, and the negative electrode termination electrode 19 included in the stacked body 14 and has an insulation property. More specifically, the sealing member 15 holds the electrode plates 21 constituting the bipolar electrodes 16, the positive electrode termination electrode 18, and the negative electrode termination electrode 19. The sealing member 15 can also function as a short circuit preventing member that prevents a short circuit between the bipolar electrodes 16 while sealing the side surface 14s of the stacked body 14.

The sealing member 15 is provided in a frame shape (here, a rectangular frame shape) along an outer shape of the electrode plate 21 when viewed in the stacking direction and is interposed between the electrode plates 21 adjacent to each other in the stacking direction at an outer edge portion 21c of the electrode plate 21. The sealing member 15 interposed between the electrode plates 21 is joined (for example, welded) to the main surface 21a at the outer edge portion 21c of the electrode plate 21. The sealing member 15 may be further joined (for example, welded) to the main surface 21b of the electrode plate 21, or the sealing members 15 adjacent to each other in the stacking direction may be joined (for example, welded) to each other. On the other hand, the sealing member 15 is also disposed on the main surface 21b of the electrode plate 21 of the positive electrode termination electrode 18 facing the outside of the stacked body 14 at the one end of the stacked body 14 in the stacking direction and is also joined (for example, welded) to the main surface 21b. Further, the sealing member 15 is disposed on the main surface 21a of the electrode plate 21 of the negative electrode termination electrode 19 facing the outside of the stacked body 14 and is joined (for example, welded) to the main surface 21a.

The positive electrode current collecting plate 12 (a main body portion 12a which will be described later) is disposed in a region surrounded by the sealing member 15 on the main surface 21b of the electrode plate 21 of the positive electrode termination electrode 18 when viewed in the stacking direction. That is, in the one end of the stacked body 14 in the stacking direction, the sealing member 15 is disposed to surround the positive electrode current collecting plate 12 when viewed in the stacking direction. Further, the negative electrode current collecting plate 13 (a main body portion 13a which will be described later) is disposed in a region surrounded by the sealing member 15 on the main surface 21a of the electrode plate 21 of the negative electrode termination electrode 19 when viewed in the stacking direction. That is, in the other end of the stacked body 14 in the stacking direction, the sealing member 15 is disposed outside the negative electrode current collecting plate 13 to surround the negative electrode current collecting plate 13 when viewed in the stacking direction.

A material forming the sealing member 15 is a resin member or the like exhibiting heat resistance. Examples of the resin member exhibiting heat resistance include polyimide (PI), polypropylene (PP), polyphenylene sulfide (PPS), modified polyphenylene ether (modified PPE), polyamide (PA), and the like. A thickness of the sealing member 15 is, for example, 400 μm or more and 900 μm or less.

An electrolytic solution (not shown) is accommodated in a space S sealed with the sealing member 15 (a region surrounded by the sealing member 15 and the electrode plate 21). An example of the electrolytic solution is a carbonate-based or polycarbonate-based electrolytic solution. A support salt contained in the electrolytic solution is, for example, a lithium salt. The lithium salt is, for example, $LiBF_4$, $LiPF_6$, $LiN(SO_2CF_3)_2$, $LiN(SO_2C_2F_5)_2$, or a mixture thereof.

The positive electrode current collecting plate 12 is a conductive member in contact with the stacked body 14 and has a plate shape. The positive electrode current collecting plate 12 is adjacent to the power storage module 11 in the stacking direction. That is, the positive electrode current collecting plate 12 is in contact with the electrode plate 21 of the positive electrode termination electrode 18. The positive electrode current collecting plate 12 has a main body portion 12a in contact with the electrode plate 21 and a protruding portion 12c that protrudes from a part of an edge 12b of the main body portion 12a in the stacking direction. Here, the connecting member 3 is connected to the protruding portion 12c. The main body portion 12a is a portion that overlaps the bipolar electrode 16 and the separator 17 in the stacking direction and has a substantially rectangular shape. A thickness of the positive electrode current collecting plate 12 is, for example, 1 mm or more and 5 mm or less.

The negative electrode current collecting plate 13 is a conductive member in contact with the stacked body 14 and has a plate shape. The negative electrode current collecting plate 13 is adjacent to the power storage module 11 in the stacking direction as the positive electrode current collecting plate 12. That is, the negative electrode current collecting plate 13 is in contact with the electrode plate 21 of the negative electrode termination electrode 19. The negative electrode current collecting plate 13 has a main body portion 13a in contact with the electrode plate 21 and a protruding portion 13c that protrudes from a part of an edge 13b of the main body portion 13a in the stacking direction. Here, the connecting member 4 is connected to the protruding portion 13c. The main body portion 13a is a portion that overlaps the bipolar electrode 16 and the separator 17 in the stacking direction and has a substantially rectangular shape. A thickness of the negative electrode current collecting plate 13 is, for example, 1 mm or more and 5 mm or less.

A through hole (not shown) penetrating in a direction (for example, the X-axis direction or the Y-axis direction) intersecting the stacking direction may be formed in at least one of the positive electrode current collecting plate 12 and the negative electrode current collecting plate 13. In this case, the heat dissipation of the power storage device 1A can be improved. Further, a fluid having a high thermal conductivity may be circulated through the through hole. In this case, the heat dissipation of the power storage device 1A can be further improved.

The two power storage modules 11 are disposed such that the positive electrode termination electrodes 18 face each other. The positive electrode current collecting plate 12 is disposed so as to be in contact with the two positive electrode termination electrodes 18 facing each other. That is, in the present embodiment, one positive electrode current collecting plate 12 functions as a positive electrode current collecting plate of the two power storage modules 11.

In the power storage device 1A, when the plurality of power storage modules 11 constituting the stacked body 2 are defined as one power storage cell group, the electrodes disposed at both ends of the power storage cell group in the stacking direction are both negative electrode termination electrodes 19 or both positive electrode termination electrodes 18. Here, the electrodes disposed at both ends of the power storage cell group in the stacking direction are both negative electrode termination electrodes 19. In other words, the two power storage modules 11 are disposed such that the negative electrode termination electrodes 19 are opposite to each other (such that the positive electrode termination electrodes 18 face each other). Each of the two negative electrode current collecting plates 13 is disposed so as to be in contact with each of the two negative electrode termination electrodes 19 opposite to each other.

Next, the intermediate member 7 will be described with reference to FIGS. 1 and 2. The intermediate member 7 is interposed between the restraint plate 5 and the stacked body 2. The intermediate member 7 electrically insulates the restraint plate 5 and the stacked body 2 from each other. In the present embodiment, the negative electrode current collecting plates 13 are disposed at both ends of the stacked body 2 in the stacking direction. Therefore, the intermediate member 7 is interposed between the restraint plate 5 and the negative electrode current collecting plate 13. The intermediate member 7 transmits the restraint load from the restraint plate 5 to the stacked body 2.

The intermediate member 7 includes a package (a first package) 71 and a fluid 72 enclosed in the package 71. The package 71 is made of a flexible material that can be deformed according to a restraint load. The material of the package 71 is, for example, a resin, and as an example, a polyolefin resin or the like such as polyethylene (PE) or polypropylene (PP). The fluid 72 is a gas, a liquid, a gel, or a mixture thereof. Further, the fluid 72 may be a mixture obtained by mixing a gas, a liquid, a gel, or a mixture thereof with a powder (for example, a fire extinguisher). The material of the fluid 72 is, for example, a liquid that does not freeze or vaporize in a usage environment. For example, oil, a coolant liquid used as cooling water for an engine, a long life coolant (LLC), or the like can be used as the material of the fluid 72. As described above, the intermediate member 7 is configured as a gas pack, a liquid pack, or a gel pack.

In a case where the material of the package 71 is a resin, the restraint load to be transmitted to the stacked body 2 is easily dispersed, and as a result, the restraint load can be uniformly applied to the power storage module 11. The material of the package 71 may be, for example, a laminated film or the like containing a metal. In a case where the material of the package 71 is a laminated film, the package 71 can be made thin. In a case where the fluid 72 is a liquid, the intermediate member 7 is less likely to be compressed, and as a result, it is possible to suitably realize that the restraint load is uniformly applied to the power storage module 11.

An adhesive layer (a second adhesive layer) 73 is disposed between the intermediate member 7 and the restraint plate 5. As a result, the intermediate member 7 is adhered to the restraint plate 5. Further, another adhesive layer (a first adhesive layer) 74 is disposed between the intermediate member 7 and the stacked body 2. As a result, the intermediate member 7 is adhered to the stacked body 2. As a result, it is possible to prevent the stacked body 2, the restraint plate 5, and the intermediate member 7 from being displaced from each other in a direction (for example, the X-axis direction or the Y-axis direction) intersecting the stacking direction.

The adhesive layers 73 and 74 do not completely cover the intermediate member 7 in order to leave a possibility for deformation, and at least a part of the intermediate member 7 is exposed. On the other hand, from the viewpoint of suppressing the displacement as described above, it is desirable to secure an adhesive area. Here, as an example, the adhesive layer 73 is provided on most of a front surface of the intermediate member 7 facing the restraint plate 5 and a back surface of the intermediate member 7 facing the stacked body 2, and thus a side surface between the front surface and the back surface of the intermediate member 7 is exposed from the adhesive layers 73 and 74 while the adhesive area is secured. An outer edge of the adhesive layer 74 is located inside an outer edge of the adhesive layer 73 when viewed in the stacking direction. The adhesive layer 73 is, for example, a double-sided tape or an adhesive.

Here, as described above, in both ends of the stacked body 2, the sealing member 15 is disposed outside the negative electrode current collecting plate 13 to surround the negative electrode current collecting plate 13 when viewed in the stacking direction. Therefore, in both ends of the stacked body 2 in the stacking direction, an outer surface of the negative electrode current collecting plate 13 and an outer surface of the sealing member 15 form an end surface. In this end surface, a step may be formed at a boundary between the negative electrode current collecting plate 13 and the sealing member 15, or the outer surface of the negative electrode current collecting plate 13 and the outer surface of the sealing member 15 may be substantially flush with each other.

The intermediate member 7 is disposed to extend from the negative electrode current collecting plate 13 to the sealing member 15 when viewed in the stacking direction. That is, in both end surfaces of the stacked body 2, the intermediate member 7 is disposed from the outer surface of the sealing member 15 on a center side to the outer surface of the negative electrode current collecting plate 13 beyond the boundary between the sealing member 15 and the negative electrode current collecting plate 13. An outer edge of the intermediate member 7 is located outside an outer edge of the negative electrode current collecting plate 13 when viewed in the stacking direction. The outer edge of the intermediate member 7 is located inside an outer edge of the sealing member 15 when viewed in the stacking direction. As a result, even in a case where there is a step at the boundary between the negative electrode current collecting plate 13 and the sealing member 15 in the end surface of the stacked body 2, the intermediate member 7 is deformed so as to follow the step, and thus the restraint load can be uniformly transmitted to the sealing member 15.

The power storage device 1A includes a sheet-shaped seal member 24. The seal member 24 is provided between the intermediate member 7 and the stacked body 2 along the outer edge of the intermediate member 7. The seal member 24 prevents moisture or the like from entering between the intermediate member 7 and the stacked body 2. The seal member 24 has a rectangular frame shape when viewed in the stacking direction. The seal member 24 surrounds the adhesive layer 74 when viewed in the stacking direction. The seal member 24 is deformed according to the deformation of the intermediate member 7. That is, the seal member 24 is deformed to follow the intermediate member 7. The seal member 24 is, for example, a rubber sheet made of silicon. The seal member 24 may be, for example, a liquid gasket.

As described above, in the power storage device 1A, the restraint load is applied to the stacked body 2 including the plurality of stacked power storage modules 11 from the pair of restraint plates 5 disposed at both ends thereof. The intermediate member 7 that transmits the restraint load from the restraint plate 5 to the stacked body 2 is disposed between the restraint plate 5 and the stacked body 2. The first intermediate member 7 includes the package 71 that is deformable according to the restraint load and the fluid 72 that is enclosed in the package 71. Therefore, even if the intermediate member 7 is compressed with a different amount of compression for each position according to the deformation of the restraint plate 5, a pressure inside the package 71 is kept constant. As a result, it is possible to uniformly apply the restraint load to the power storage module 11. As a result, the restraint plate 5 is allowed to be deformed so as to be bent with a reaction force of the restraint load. Therefore, it is possible to realize that the weight of the restraint plate 5 is reduced.

Further, in the power storage device 1A, the power storage module 11 further includes a plurality of sealing members 15 provided in each of the plurality of bipolar electrodes 16 and the like so as to seal the side surface 14s of the stacked body 14 in the stacking direction. The stacked body 2 further includes the negative electrode current collecting plate 13 that constitutes one end of the stacked body 2 in the stacking direction and is electrically connected to the negative electrode termination electrode 19. In the one end of the stacked body 2, the sealing member 15 is disposed outside the negative electrode current collecting plate 13 to surround the negative electrode current collecting plate 13 when viewed in the stacking direction. The intermediate member 7 is disposed from the negative electrode current collecting plate 13 to the sealing member 15. Therefore, the restraint load can be uniformly applied to the sealing member 15 in addition to the power storage module 11.

Further, the power storage device 1A further includes the adhesive layer 74 disposed between the intermediate member 7 and the stacked body 2 to adhere the intermediate member 7 and the stacked body 2 to each other and the adhesive layer 73 disposed between the intermediate member 7 and the restraint plate 5 to adhere the intermediate member 7 and the restraint plate 5 to each other. In this case, even if the intermediate member 7 having the package 71 that can be deformed as described above is used, the displacement between the restraint plate 5 and the stacked body 2 is suppressed in a direction intersecting the stacking direction.

Further, the power storage device 1A includes the seal member 24 provided between the intermediate member 7 and the stacked body 2 along the outer edge of the intermediate member 7. In this case, since the entering of moisture or the like between the intermediate member 7 and the stacked body 2 is suppressed, the generation of rust and the like in the stacked body 2 is suppressed.

Further, the power storage device 1A includes the fastening member 6 for applying the restraint load to the stacked body 2 via the restraint plates 5 by fastening the restraint plates 5 to each other. In this case, even if the restraint plate 5 is deformed, the restraint load can be uniformly applied to the stacked body 2.

Second Embodiment

Hereinafter, a power storage device and a method for manufacturing a power storage device according to a second embodiment will be described in detail with reference to FIGS. 3 to 6. In the description of FIGS. 3 to 6, the same or equivalent elements may be designated by the same reference signs, and duplicate description may be omitted.

Figure 3:
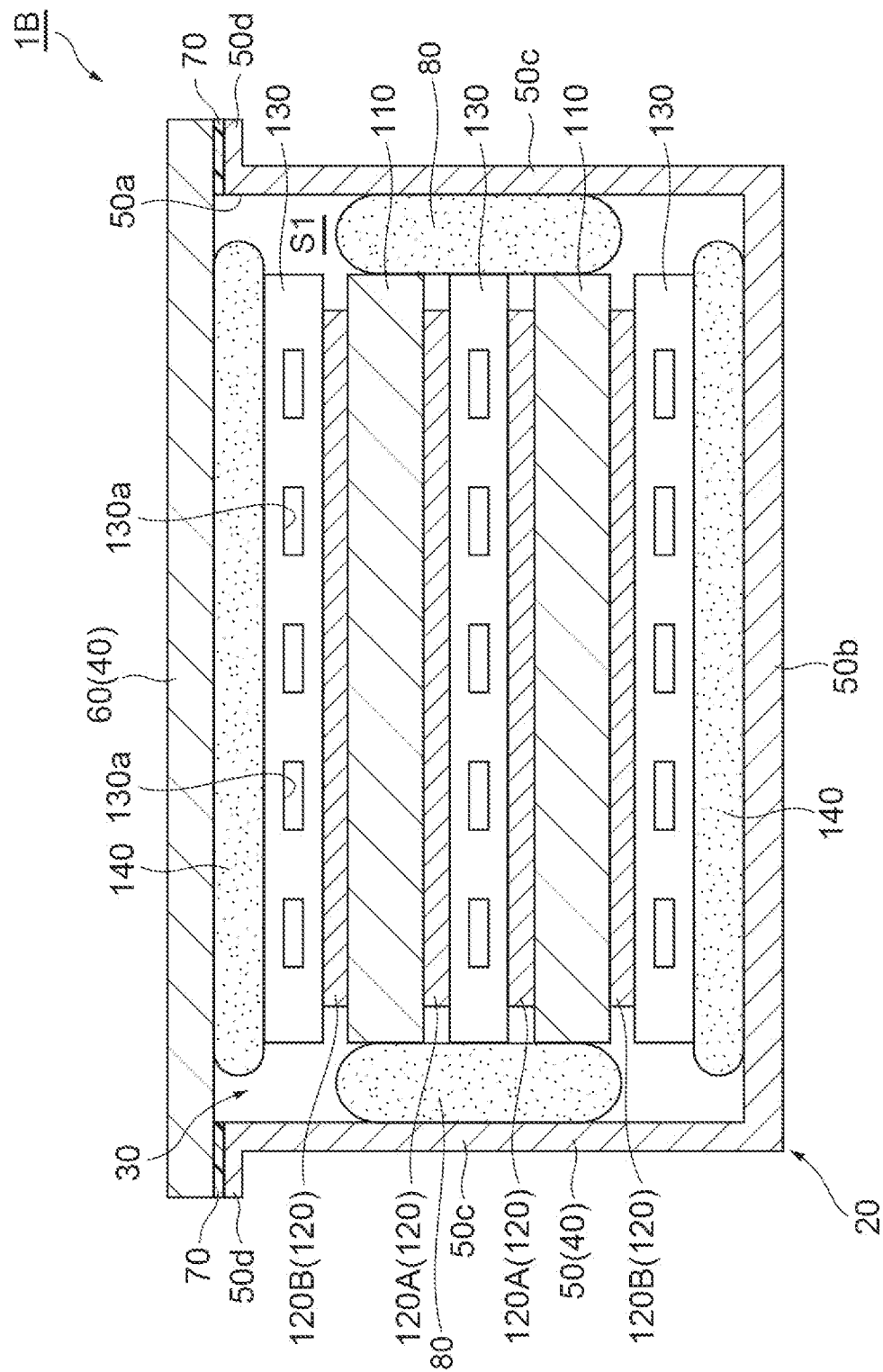
FIG. 3 is a schematic cross-sectional view showing a power storage device according to a second embodiment.

FIG. 3 is a schematic cross-sectional view showing the power storage device according to the second embodiment. A power storage device 1B shown in FIG. 3 is a device that is used as a battery for various vehicles such as forklifts, hybrid vehicles, and electric vehicles. As shown in FIG. 3, the power storage device 1B is configured to include a case 20, a stacked body (a modular structure) 30, an intermediate member (a first intermediate member) 140, and a damper (a second intermediate member) 80.

The case 20 has a case main body 40 formed of a metal such as stainless steel and having a rectangular parallelepiped shape. The case main body 40 is constituted by a bottomed box-shaped main body portion 50 that has an opening portion 50a on one side thereof and a flat plate-shaped lid portion 60 that closes the opening portion 50a of the main body portion 50. The main body portion 50 has a bottom wall portion 50b and a side wall portion 50c erected on each of four side edges of the bottom wall portion 50b. A flange 50d is provided around the opening portion 50a of the main body portion 50, and the lid portion 60 is airtightly fixed to the flange 50d with a seal member 70. As a result, an internal space 51 that airtightly accommodates a power storage element including the power storage module 110 is formed in the case main body 40.

The stacked body 30 is configured to include a power storage module 110, a current collecting plate 120, and a heat exchanger 130. Here, the stacked body 30 has two power storage modules 110 and three heat exchangers 130, and the heat exchanger 130 and the power storage module 110 are alternately disposed such that the power storage module 110 is sandwiched between the heat exchangers 130. The number of the power storage modules 110 and the heat exchangers 130 which are disposed is not limited to the example of FIG. 3, and a larger number of the power storage modules 110 and the heat exchangers 130 may be alternately disposed. The damper (the second intermediate member) 80 is a member that alleviates the influence of vibration on the stacked body 30 in a case where vibration is applied to the power storage device 1B. The damper 80 is disposed in the case 20 together with the stacked body 30. The details of the damper 80 will be described later.

The current collecting plate 120 is constituted by a positive electrode current collecting plate 120A and a negative electrode current collecting plate 120B. The positive electrode current collecting plate 120A is disposed on a central portion side of the stacked body 30 in the stacking direction, and the negative electrode current collecting plate 120B is disposed on an end portion side of the stacked body 30 in the stacking direction. The positive electrode current collecting plates 120A and the negative electrode current collecting plates 120B are connected to each other outside the case 20 with a bus bar (not shown).

The heat exchanger 130 is a portion that cools the power storage module 110. The heat exchanger 130 is, for example, a plate-shaped member having a flow path 130a through which a cooling fluid passes. The flow path 130a is constituted by a through hole that penetrates the plate-shaped member in an in-plane direction. A supply pipe that passes through the case 20 is connected to the flow path 130a, and the cooling fluid is circulated to and from the outside of the case 20. As the cooling fluid, for example, air, water, oil, or the like is used. The cooling fluid may have an electrical insulation property. In a case where the cooling fluid has conductivity, the heat exchanger 130 is preferably insulated from the cooling fluid.

The intermediate member 140 has the same configuration as the intermediate member 7 of the power storage device 1A of the first embodiment. The intermediate member 140 is disposed at each of both ends of the stacked body 30 in the stacking direction (a first direction). The intermediate member 140 is located between the bottom wall portion 50b of the main body portion 50 and the stacked body 30 and between the lid portion 60 and the stacked body 30. The intermediate member 140 can also function as a member for holding between the bottom wall portion 50b and the stacked body 30 and the lid portion 60 and the stacked body 30. Due to the intermediate member 140, a restraint load from the bottom wall portion 50b and the lid portion 60 is applied in the stacking direction of the stacked body 30. The intermediate member 140 may be adhered to the case 20 and the heat exchanger 130 with an adhesive or the like.

The stacked body 30, the intermediate member 140, and the damper 80 are accommodated in the case 20. The stacked body 30 is accommodated in the main body portion 50 such that a stacking direction of the stacked body 30 coincides with a facing direction between the opening portion 50a and the bottom wall portion 50b in the main body portion 50. The lid portion 60 is constituted by a panel member of a vehicle to which the power storage device 1B is attached. The flange 50d of the main body portion 50 is fastened to the lid portion 60 by a plurality of bolts (not shown) and nuts (not shown), for example. As a panel member of a vehicle, for example, a floor panel or the like is used.

The bottom wall portion 50b and the lid portion 60 function as a pair of restraint members. Specifically, the internal space 51 is airtightly sealed in a state decompressed at the time of manufacture, and thus a state decompressed with respect to atmospheric pressure by suction of a decompression pump (not shown) is maintained. An internal pressure of the internal space 51 is smaller than the atmospheric pressure outside the case 20. Therefore, a force acts on the case 20 from the outside toward the inside of the case 20. That is, a restraint load is applied to the stacked body 30 via the bottom wall portion 50b and the lid portion 60.

Figure 4:
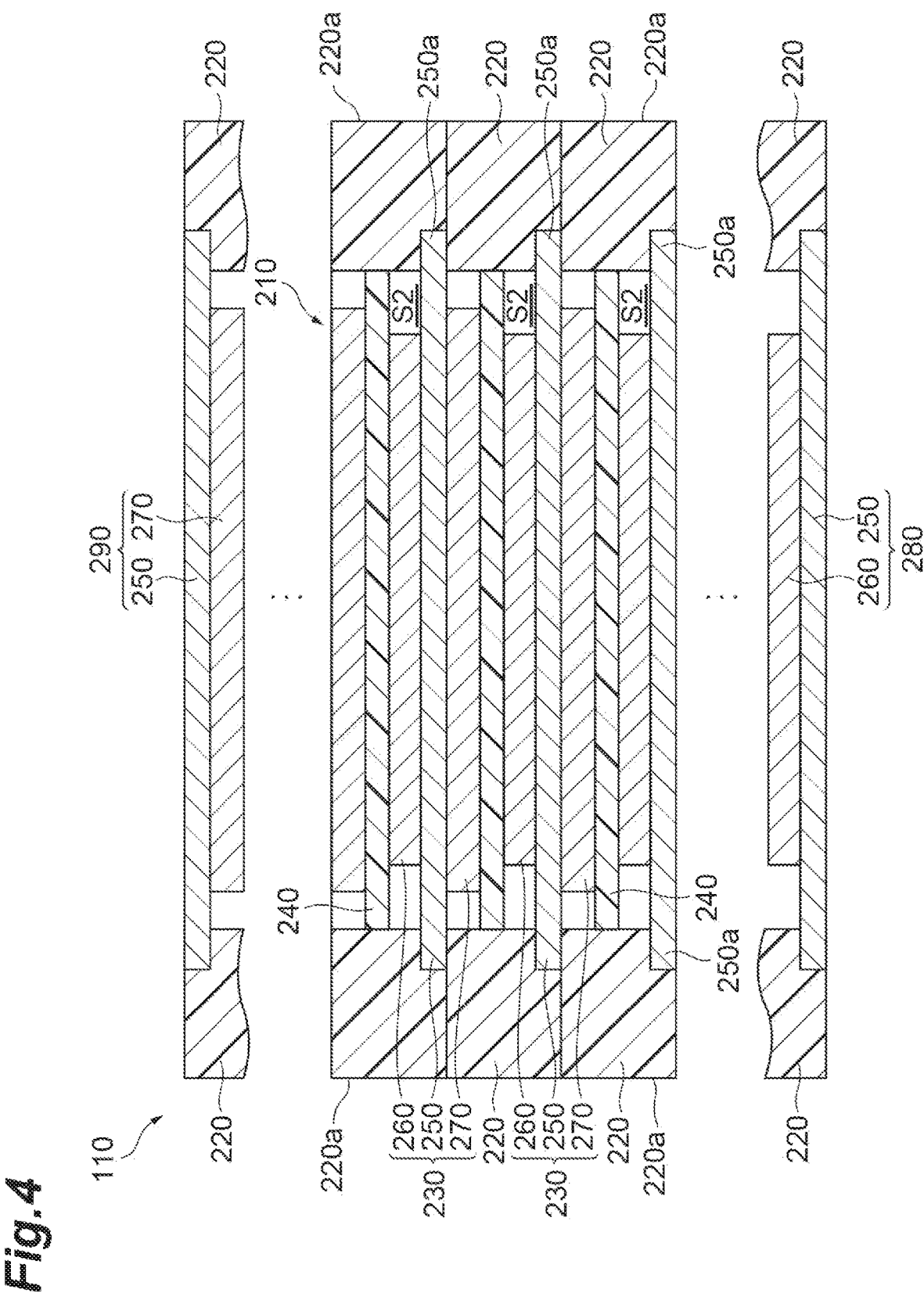
FIG. 4 is a schematic cross-sectional view of a layer configuration of a power storage module shown in FIG. 3.

FIG. 4 is a schematic cross-sectional view of a layer configuration of the power storage module. The power storage module 110 shown in this figure is, for example, a secondary battery such as a nickel hydrogen secondary battery or a lithium ion secondary battery. The power storage module 110 may be an electrical double layer capacitor or an all solid state battery. In the present embodiment, a bipolar type lithium ion secondary battery is exemplified.

As shown in FIG. 4, the power storage module 110 includes an electrode stacked body 210 and a sealing part (a sealing member) 220. The electrode stacked body 210 is configured to include a plurality of bipolar electrodes 230 and a plurality of separators 240. Each of the bipolar electrode 230 has a metal foil (a current collector) 250, a positive electrode active material layer (a positive electrode layer) 260 formed on one surface of the metal foil 250, and a negative electrode active material layer (a negative electrode layer) 270 formed on the other surface of the metal foil 250. The positive electrode active material layer 260 and the negative electrode active material layer 270 have a rectangular shape when viewed in the stacking direction. The negative electrode active material layer 270 has a shape slightly larger than that of the positive electrode active material layer 260, and a formation region of the positive electrode active material layer 260 overlaps a formation region of the negative electrode active material layer 270 when viewed in the stacking direction. The bipolar electrode 230 may be formed by overlapping a metal foil 250 having only a positive electrode active material layer 260 formed on one surface thereof and a metal foil 250 having only a negative electrode active material layer 270 formed on one surface thereof each other such that the metal foils 250 and 250 are in contact with each other.

Further, a positive electrode termination electrode 280 is stacked on one end of the electrode stacked body 210 in the stacking direction, and a negative electrode termination electrode 290 is stacked on the other end of the electrode stacked body 210 in the stacking direction. The positive electrode termination electrode 280 is formed of a metal foil 250 having only a positive electrode active material layer 260 formed on one surface thereof, and the negative electrode termination electrode 290 is formed of a metal foil 250 having only a negative electrode active material layer 270 formed on one surface thereof. These termination electrodes are disposed such that the active material layer faces a central portion side (a side of the adjacent bipolar electrode 230) in the stacking direction.

The metal foil 250 has the same configuration as the electrode plate 21 of the first embodiment. The positive electrode active material layer 260 has the same configuration as the positive electrode layer 22 of the first embodiment. The negative electrode active material layer 270 has the same configuration as the negative electrode layer 23 of the first embodiment.

The separator 240 is a sheet-shaped member that separates the adjacent bipolar electrodes 230 and 230 from each other, the bipolar electrode 230 and the positive electrode termination electrode 280 from each other, or the bipolar electrode 230 and the negative electrode termination electrode 290 from each other. The separator 240 has a rectangular shape slightly larger than that of the positive electrode active material layer 260 and the negative electrode active material layer 270. The separator 240 is located between the positive electrode active material layer 260 and the negative electrode active material layer 270 and is disposed to overlap the entire surfaces of the formation region of the positive electrode active material layer 260 and the formation region of the negative electrode active material layer 270 when viewed in the stacking direction. The separator 240 has the same configuration as the separator 17 of the first embodiment.

The sealing part 220 is a member that seals a side surface portion of the electrode stacked body 210 in the stacking direction and prevents a short circuit between the bipolar electrodes 230 and 230 adjacent to each other. The sealing part 220 has, for example, a rectangular frame shape in a plan view, and is welded to one surface of an edge portion 250a of the metal foil 250. An edge portion 220a of the sealing part 220 projects outward from the edge portion 250a of the metal foil 250 in an in-plane direction of the metal foil 250. The edge portions 220a and 22a of the sealing parts 220 adjacent to each other in the stacking direction may be welded to each other by hot plate welding or the like.

Examples of a material for forming the sealing part 220 include a resin member or the like exhibiting an electrical insulation property and heat resistance. The material of the sealing part 220 is the same as the material of the sealing member 15 of the first embodiment. An electrolytic solution is accommodated in an internal space S2 sealed with the sealing part 220 and the separator 240. The electrolytic solution is the same as the electrolytic solution accommodated in the space S of the first embodiment.

Subsequently, the damper 80 described above will be described in detail.

Figure 5:
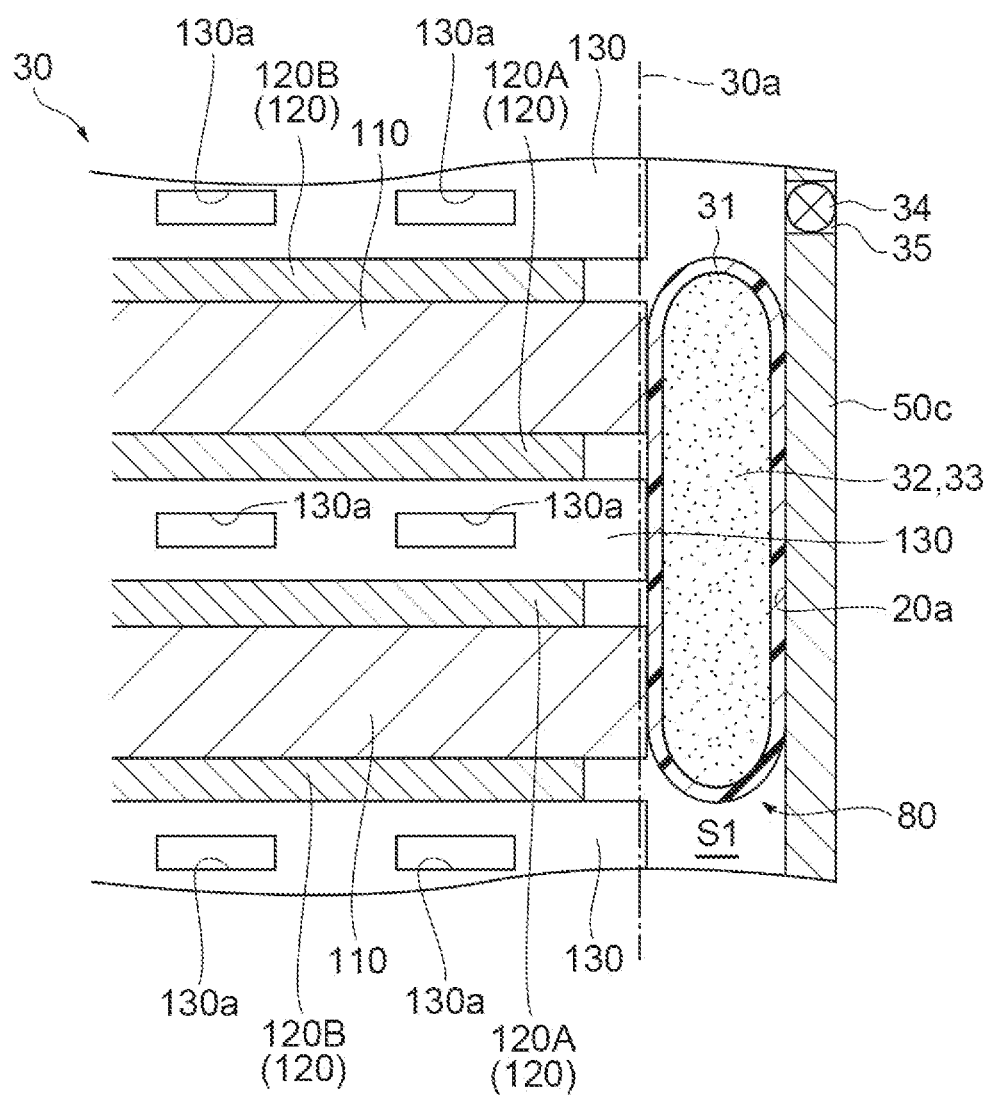
FIG. 5 is an enlarged cross-sectional view of a main part showing an example of a configuration of a damper.
Figure 6:
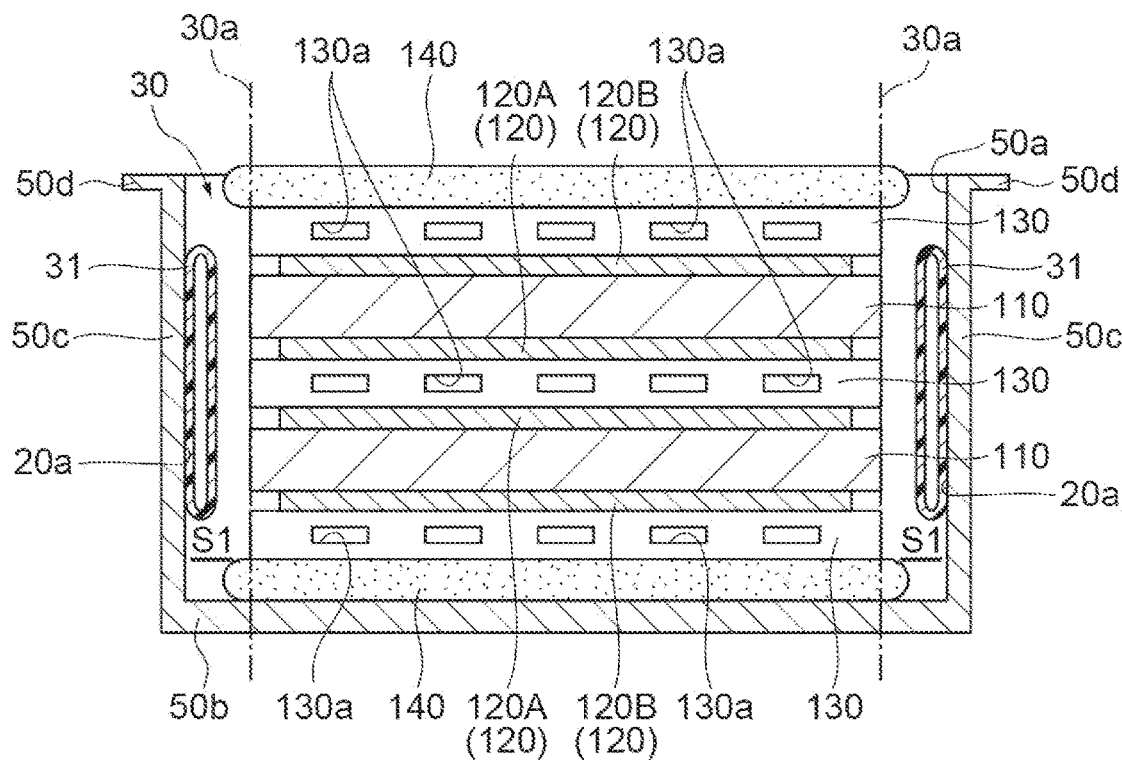
FIGS. 6(a) and 6(b) are schematic cross-sectional views showing an embodiment of a method for manufacturing a power storage device according to the second embodiment.
Figure 6:
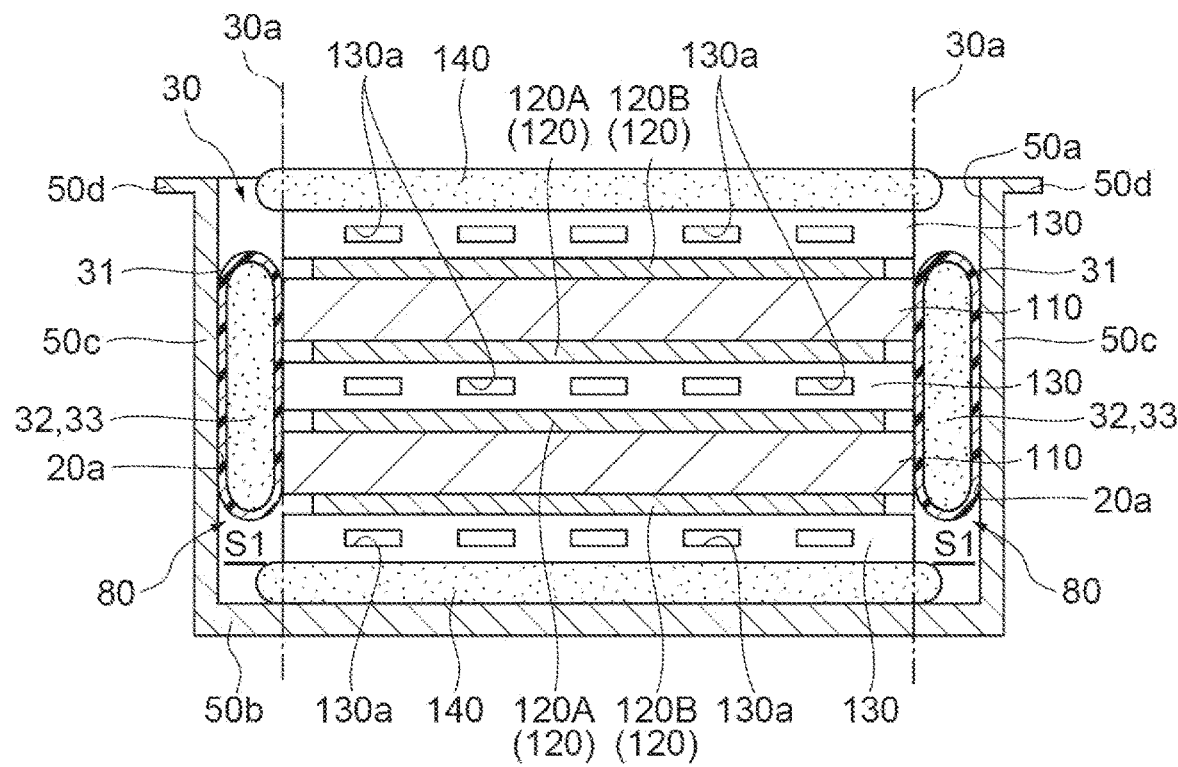

FIG. 5 is an enlarged cross-sectional view of a main part showing an example of a configuration of the damper. As shown in this figure, the damper 80 is constituted by a package (a second package) 31 and a shock absorbing material 32 filled in the package 31. The package 31 is made of a material that shrinks in a case where it is not filled with contents (that is, the shock absorbing material 32) and is able to expand according to the filling with the contents. Further, the package 31 is made of a material having an electrical insulation property. Examples of the material of the package 31 include a polyolefin resin or the like such as polyethylene (PE) or polypropylene (PP). In a case where the material of the package 31 is a resin, the restraint load to be transmitted to the stacked body 30 is easily dispersed, and as a result, the restraint load can be uniformly applied to the power storage module 110. The material of the package 31 may be, for example, a laminated film or the like containing a metal. In a case where the material of the package 31 is a laminated film, the package 31 can be made thin.

The package 31 is in an expanded state as compared with that before the filling due to the filling with the shock absorbing material 32. As a result, the damper 80 is interposed between the side surface 30a of the stacked body 30 extending in the stacking direction of the power storage module 110 and the inner surface 20a of the case 20. In the example of FIG. 5, the side surface 30a of the stacked body 30 is defined by a side surface of the power storage module 110 extending in the same stacking direction and a side surface of the heat exchanger 130. Further, the inner surface 20a of the case 20 is defined by the side wall portion 50c of the case main body 40. The damper 80 is in a state interposed between the heat exchanger 130 at a center of the stacked body 30 and a pair of power storage modules 110 and 110 with the heat exchanger 130 sandwiched therebetween in the stacking direction and the inner surface 20a of the case 20 without a gap.

The damper 80 may be provided corresponding to a pair of side wall portions 50c facing each other in the case main body 40, or may be provided corresponding to all the side wall portions 50c. In a case where the damper 80 is provided corresponding to all the side wall portions 50c, the damper 80 may be provided in a cylindrical shape so as to surround all the side surfaces 30a of the stacked body 30. The damper 80 may be fixed to at least one of the side surface 30a of the stacked body 30 and the inner surface 20a of the case 20 by adhesion or the like.

Further, in an aspect in which the number of the power storage module 110 and the heat exchanger 130 which are disposed is larger than that in the aspect of FIG. 3 and the power storage module 110 without the damper 80 interposed between it and the inner surface 20a of the case 20 is present, the power storage module 110 and the current collecting plate 120 adjacent thereto, and further, the current collecting plate 120 and the heat exchanger 130 adjacent thereto may be joined to each other with an adhesive or the like. In a case where the stacked body 30 is held in the stacking direction by the intermediate member 140, the power storage module 110, the current collecting plate 120, and the heat exchanger 130 may not be joined to each other with an adhesive or the like. In a case where the damper 80 is interposed between the entire side surface 30a of the stacked body 30 and the inner surface 20a of the case 20, the power storage module 110, the current collecting plate 120, and the heat exchanger 130 may not be joined to each other with an adhesive or the like.

As the shock absorbing material 32, a material made of a gas, a liquid, or a gel can be used. As the shock absorbing material 32, a solid material such as a powder or particles can also be used. The shock absorbing material 32 may be a material made of a mixture of them. Examples of the material include oils that do not freeze and vaporize in the environment of use, coolants or long life coolants (LLC) used as engine cooling water, and the like. In a case where the shock absorbing material 32 is a liquid, the damper 80 is less likely to be compressed, and as a result, it is possible to suitably realize that the influence of vibration on the stacked body 30 is alleviated by the damper 80.

Further, the package 31 may be filled with an ignition inhibitor 33 together with the shock absorbing material 32. The ignition inhibitor 33 is a material that suppresses ignition such as a fire extinguisher or a flame retardant. The ignition inhibitor 33 may be any one of a gas, a liquid, or a solid (a powder). Examples of the ignition inhibitor 33 include ammonium dihydrogen phosphate (chemical formula: $NH_4H_2PO_4$, a main component of an ABC powder fire extinguisher) which is an inorganic powder.

In a case where the package 31 is filled with the ignition inhibitor 33, the package 31 may be made of a material that can be broken by a gas generated from the power storage module 110 when the power storage module 110 deteriorates or is abnormal. In this case, as the material of the package 31, for example, natural polymers (protein such as collagen or gelatin, polysaccharide such as cellulose or starch, natural rubber, and the like, as well as a mixture of gelatin-gum arabic, gelatin-gellan gum, and the like) and synthetic polymers (polystyrene, polyvinyl alcohol, carboxymethyl cellulose, polyvinylpyrrolidone, polyamide, polyester, polyurethane, and the like) can be used.

In the case 20, the wall portion constituting the inner surface 20a may be provided with a pressure release valve 34 at a position not in contact with the damper 80. In the example of FIG. 5, in the side wall portion 50c of the case main body 40, a through hole 35 for allowing the internal space S1 of the case main body 40 and the outside of the case main body 40 to communicate with each other is provided at a position closer to the lid portion 60 than to the damper 80, and the pressure release valve 34 is provided in the through hole 35.

The pressure release valve 34 is a valve that operates in a case where an internal pressure of the case main body 40 rises due to a high temperature gas generated when the power storage module 110 deteriorates or is abnormal. By operating the pressure release valve 34, the gas in the internal space S1 of the case main body 40 is discharged to the outside of the case main body 40, and thus pressure alleviation is performed such that the internal pressure of the case main body 40 does not exceed a predetermined value. The type of the pressure release valve 34 is not particularly limited, but may be, for example, a break type valve that breaks when the pressure exceeds a predetermined threshold value and may be a fusible plug type valve that fuses when the temperature exceeds a predetermined threshold value.

In a case where the power storage device 1B described above is manufactured, as shown in FIG. 6(a), the stacked body 30 is disposed in the main body portion 50 of the case 20. Further, an insulating package 31 that can be expanded according to the filling with the contents is disposed between the side surface 30a of the stacked body 30 and the inner surface 20a of the case 20. At this point of time, the package 31 is not filled with the shock absorbing material 32, and the package 31 is disposed between the side surface 30a of the stacked body 30 and the inner surface 20a of the case 20 in a shrunk state. Either of the stacked body 30 and the package 31 may be disposed first in the case 20. In a case where the package 31 is disposed first, the package 31 may be fixed in advance to a predetermined position on the inner surface 20a of the case 20 by adhesion or the like.

Next, as shown in FIG. 6(b), the package 31 is filled with the shock absorbing material 32. Due to the filling with the shock absorbing material 32, the package 31 expands between the side surface 30a of the stacked body 30 and the inner surface 20a of the case 20, and the damper 80 interposed between the side surface 30a of the stacked body 30 and the inner surface 20a of the case 20 is formed. When the package 31 is filled with the shock absorbing material 32, for example, a valve to which a supply pipe for supplying the shock absorbing material 32 can be connected may be provided in the package 31, the package 31 may be filled with the shock absorbing material 32 through the supply pipe, and then the valve may be closed. Further, the package 31 may be filled with the shock absorbing material 32 using a syringe, and after the filling with the shock absorbing material 32, a hole made by the syringe may be closed by welding or attaching a sealing member. After the damper 80 is formed, the lid portion 60 is fixed to and airtightly sealed to the main body portion 50 via the seal member 70 (see FIG. 3) in a state where the internal space S1 is decompressed, and thus the power storage device 1B shown in FIG. 3 is obtained.

As described above, the power storage device 1B includes the case 20 for accommodating the stacked body 30. The case 20 has the bottomed box-shaped main body portion 50 provided with the opening portion 50a that is open in the stacking direction and the lid portion 60 that closes the opening portion 50a. The bottom wall portion 50b of the main body portion 50 facing the opening portion 50a in the stacking direction and the lid portion 60 constitute the pair of restraint members. The restraint load is applied to the stacked body 30 via the bottom wall portion 50b and the lid portion 60 by reducing a pressure inside the case 20 with respect to the atmospheric pressure. In this case, similarly to the power storage device 1A of the first embodiment, even if the intermediate member 140 is compressed with a different amount of compression for each position according to the deformation of the bottom wall portion 50b or the lid portion 60, a pressure inside the intermediate member 140 is kept constant. As a result, it is possible to uniformly apply the restraint load to the stacked body 30. Further, the influence of vibration on the stacked body 30 or swell of the lid portion 60 can be sufficiently alleviated by the intermediate member 140.

In the present embodiment, the lid portion 60 is constituted by a panel member of a vehicle. In this case, the influence of swell of a panel member of a vehicle on the stacked body 30 can be sufficiently alleviated by the intermediate member 140.

In the present embodiment, the damper 80 is interposed between the side surface 30a of the stacked body 30 extending in the stacking direction of the power storage module 110 and the inner surface 20a of the case 20. The package 31 can be expanded according to filling with contents, and the damper 80 is configured by filling the package 31 with the shock absorbing material 32. Therefore, after the package 31 in a shrunk state is disposed between the side surface 30a of the stacked body 30 and the inner surface 20a of the case 20, the package 31 is filled with the shock absorbing material 32 and the package 31 is expanded. As a result, the damper 80 can be disposed between the side surface 30a of the stacked body 30 and the inner surface 20a of the case 20 without a gap. Therefore, in this power storage device 1B, the influence of vibration on the stacked body 30 can be sufficiently alleviated by the damper 80. Further, the accommodation of the stacked body 30 in the case 20 is not hindered by the damper 80, and the ease of accommodating the stacked body 30 in the case 20 can be sufficiently ensured.

In the present embodiment, the stacked body 30 includes the heat exchanger 130 disposed between the power storage modules 110 and 110 adjacent to each other in the stacking direction. The damper 80 is interposed between at least these power storage modules 110 and 110 and the heat exchanger 130 and the inner surface 20a of the case 20. As a result, the influence of vibration on main constituent elements of the stacked body 30 can be sufficiently alleviated.

In the present embodiment, the package 31 is made of a material having an electrical insulation property. As a result, the electrical insulation property between the stacked body 30 and the case 20 can be ensured by the interposition of the damper 80. Since it is not necessary to dispose another insulating member for the insulation between the stacked body 30 and the case 20, a device configuration of the power storage device 1B can be simplified.

In the present embodiment, the side wall portion 50c constituting the inner surface 20a of the case 20 is provided with a pressure release valve 34 at a position not in contact with the damper 80. As a result, the pressure release valve 34 operates in a case where the internal pressure of the case 20 increases when the power storage module 110 is deteriorated or abnormal, and the pressure inside the case 20 can be alleviated. By providing the pressure release valve 34 at a position not in contact with the damper 80, it is possible to prevent the pressure alleviation by the pressure release valve 34 from being hindered by the damper 80.

In the present embodiment, the package 31 is made of a material that can be broken by a gas generated from the power storage module 110 when the power storage module 110 deteriorates or is abnormal. Further, the package 31 is filled with the ignition inhibitor 33 together with the shock absorbing material 32. In this case, the package 31 is broken by the gas generated from the power storage module 110 when the power storage module 110 deteriorates or is abnormal, and the gas can be brought into contact with the ignition inhibitor 33 in the package 31. Therefore, the safety of the power storage device 1B can be enhanced.

Modification Examples

In the above embodiments, an aspect of the present disclosure has been described. Therefore, the present disclosure may be modified without limitation to the above embodiments.

Figure 7:
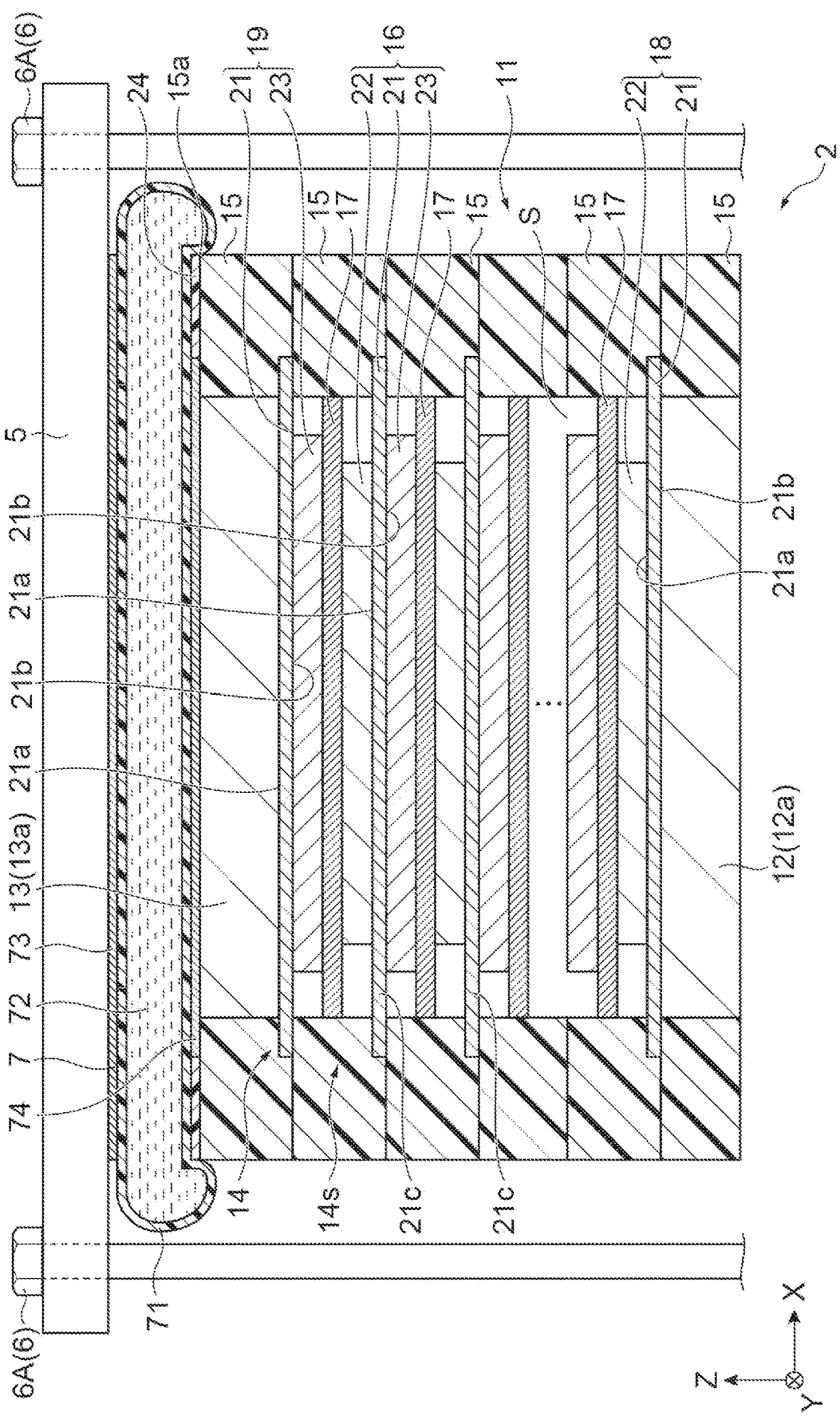
FIG. 7 is a schematic cross-sectional view of a power storage module according to a modification example.

For example, as shown in FIG. 7, in the first embodiment, the outer edge of the first intermediate member 7 may be located outside the outer edge of the sealing member 15 disposed outside the negative electrode current collecting plate 13 when viewed in the stacking direction. When viewed in the stacking direction, the entirety of the negative electrode current collecting plate 13 and the sealing member 15 is located within a disposition region of the intermediate member 7. That is, when viewed in the stacking direction, an area of the intermediate member 7 is larger than the total area of the negative electrode current collecting plate 13 and the area of the sealing member 15. In this case, the seal member 24 is provided along the outer edge of the sealing member 15 of the stacked body 2. When a restraint load is applied to the stacked body 2, a portion of the intermediate member 7 overlapping the negative electrode current collecting plate 13 and the sealing member 15 is compressed, and a portion of the intermediate member 7 located outside the sealing member 15 is deformed toward the sealing member 15 to cover an edge 15a of the sealing member 15. As a result, the movement of the intermediate member 7 is restricted by the edge 15a of the sealing member 15, and thus the displacement between the intermediate member 7 and the stacked body 2 is suppressed.

Figure 8:
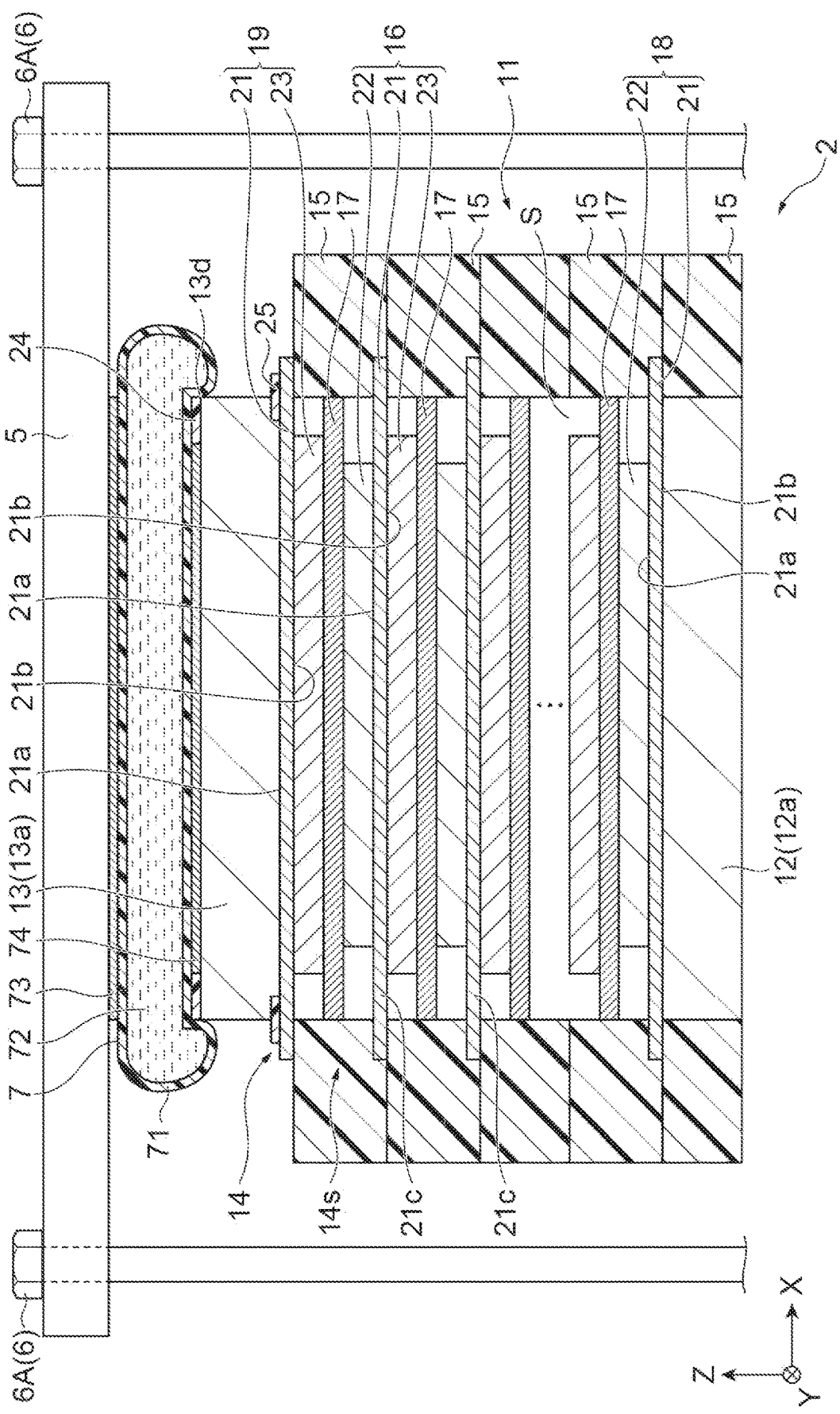
FIG. 8 is a schematic cross-sectional view of a power storage module according to a modification example.

Further, as shown in FIG. 8, the power storage device 1A may include a sheet-shaped seal member 25 instead of the sealing member 15 disposed outside the negative electrode current collecting plate 13. The seal member 25 is provided between the negative electrode current collecting plate 13 and the negative electrode termination electrode 19 along the outer edge of the negative electrode current collecting plate 13. The seal member 25 prevents moisture or the like from entering between the negative electrode current collecting plate 13 and the negative electrode termination electrode 19. The seal member 25 has a rectangular frame shape when viewed in the stacking direction. A material of the seal member 25 is, for example, a rubber made of silicon. The seal member 25 may be, for example, a liquid gasket.

Further, even in the case where the power storage device 1A includes the seal member 25 instead of the sealing member 15, the outer edge of the intermediate member 7 may be located outside an outer edge of the negative electrode current collecting plate 13 when viewed in the stacking direction. The intermediate member 7 includes the negative electrode current collecting plate 13 when viewed in the stacking direction. When viewed in the stacking direction, the area of the intermediate member 7 is larger than the area of the negative electrode current collecting plate 13. In this case, when a restraint load is applied to the stacked body 2 as described above, the portion of the intermediate member 7 overlapping the negative electrode current collecting plate 13 is compressed, and the portion of the intermediate member 7 located outside the negative electrode current collecting plate 13 is deformed toward the negative electrode current collecting plate 13 to cover an edge 13d of the negative electrode current collecting plate 13. As a result, the movement of the intermediate member 7 is restricted by the edge 13d of the negative electrode current collecting plate 13, and thus the displacement between the intermediate member 7 and the stacked body 2 is suppressed.

Figure 9:
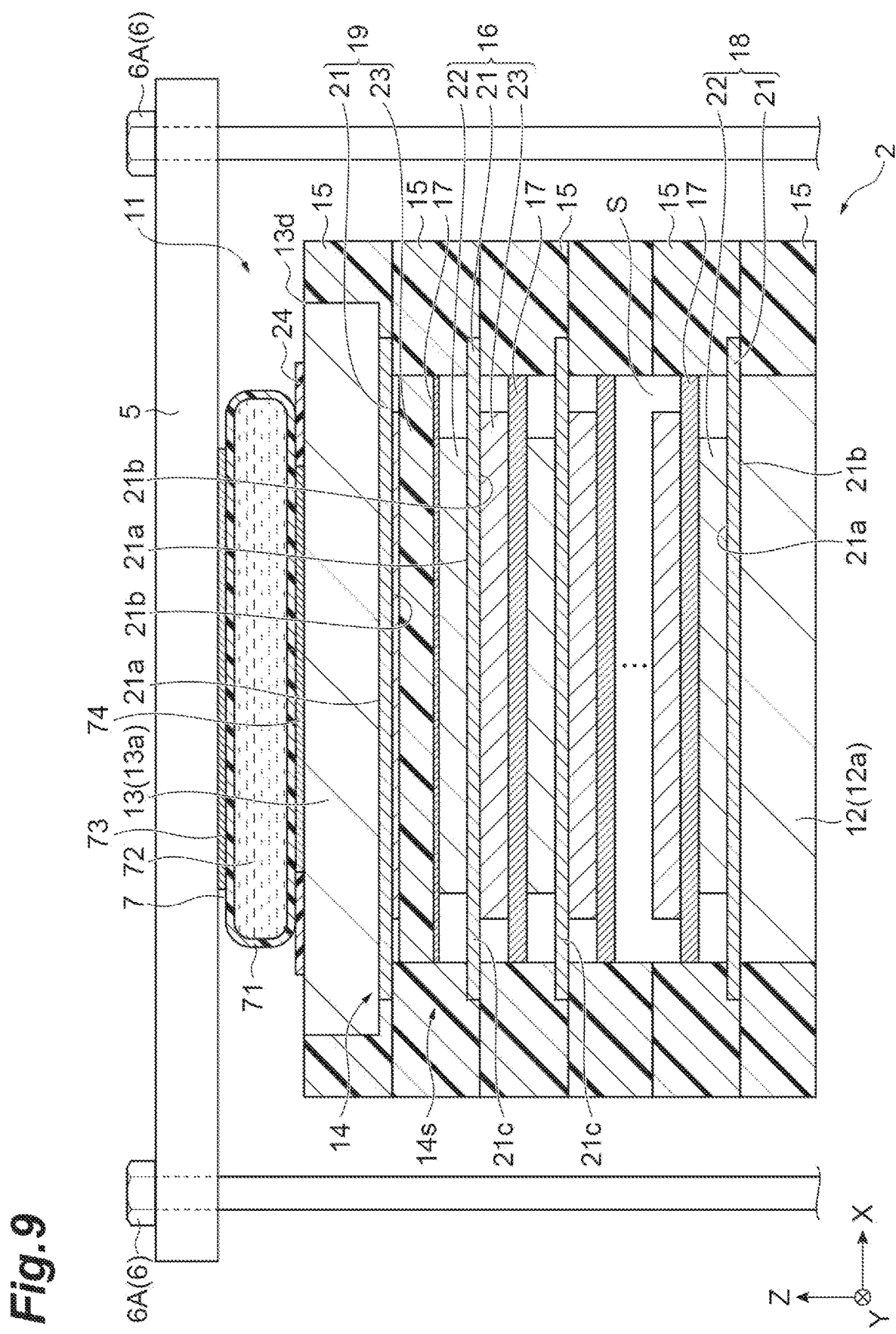
FIG. 9 is a schematic cross-sectional view of a power storage module according to a modification example.

Further, as shown in FIG. 9, the outer edge of the intermediate member 7 may be located inside the outer edge of the negative electrode current collecting plate 13 when viewed in the stacking direction. That is, when viewed in the stacking direction, the area of the intermediate member 7 is smaller than the area of the negative electrode current collecting plate 13. In this case, since the package 71 of the intermediate member 7 is not in contact with the edge 13d of the negative electrode current collecting plate 13, damage to the package 71 is suppressed especially in a case where the package 71 is brittle. The outer edge of the intermediate member 7 is located outside an outer edge of the positive electrode layer 22 when viewed in the stacking direction.

Further, the outer edge of the negative electrode current collecting plate 13 may be located outside the outer edge of the electrode plate 21 of the negative electrode termination electrode 19 when viewed in the stacking direction. When viewed in the stacking direction, the area of the negative electrode current collecting plate 13 is larger than the area of the electrode plate 21. In this case, since the electrode plate 21 is not in contact with the edge of the negative electrode current collecting plate 13, damage to the electrode plate 21 is suppressed.

Figure 10:
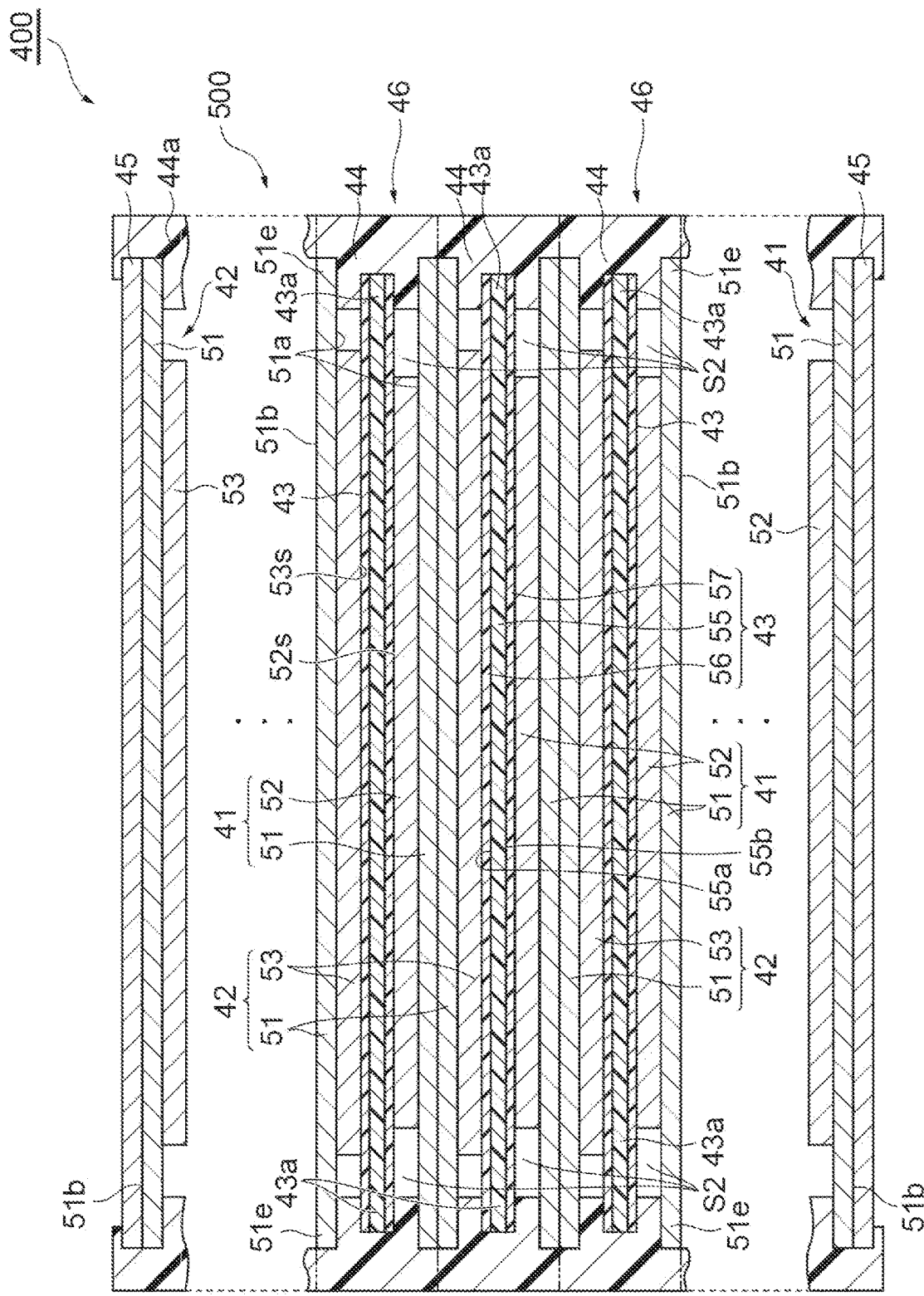
FIG. 10 is a schematic cross-sectional view of a power storage module according to a modification example.

Further, as shown in FIG. 10, in the first embodiment, the power storage device 1A may include a power storage module 400 instead of the power storage module 11. The power storage module 400 is configured to include a cell stack 500 in which a plurality of power storage cells 46 are stacked in the stacking direction. Each power storage cell 46 includes a positive electrode 41, a negative electrode 42, a separator 43, and a spacer (a sealing member) 44. The positive electrode 41 includes a current collector 51 and a positive electrode active material layer (a positive electrode layer) 52 provided on a first surface 51a of the current collector 51. The positive electrode 41 is, for example, a rectangular electrode. The negative electrode 42 includes a current collector 51 and a negative electrode active material layer (a negative electrode layer) 53 provided on a first surface 51a of the current collector 51. The negative electrode 42 is, for example, a rectangular electrode. The negative electrode 42 is disposed such that the negative electrode active material layer 53 faces the positive electrode active material layer 52. Both the positive electrode active material layer 52 and the negative electrode active material layer 53 are formed in a rectangular shape. The negative electrode active material layer 53 is formed to be slightly larger than the positive electrode active material layer 52, and the entire formation region of the positive electrode active material layer 52 is located in a formation region of the negative electrode active material layer 53 in a plan view in the stacking direction.

Each current collector 51 has a second surface 51b which is a surface opposite to the first surface 51a. The positive electrode active material layer 52 is not formed on the second surface 51b of the current collector 51 of the positive electrode 41. The negative electrode active material layer 53 is not formed on the second surface 51b of the current collector 51 of the negative electrode 42. The cell stack 500 is configured by stacking the power storage cells 46 such that the second surface 51b of the current collector 51 of the positive electrode 41 and the second surface 51b of the current collector 51 of the negative electrode 42 are in contact with each other. As a result, the plurality of power storage cells 46 are electrically connected in series. In the cell stack 500, the power storage cells 46 and 46 adjacent to each other in the stacking direction form a pseudo bipolar electrode in which the current collector 51 of the positive electrode 41 and the current collector 51 of the negative electrode 42 in contact with each other serve as an electrode body (one current collector). That is, one bipolar electrode includes two current collectors 51 and 51 adjacent to each other, that is, the positive electrode active material layer 52 and the negative electrode active material layer 53. The current collector 51 of the positive electrode 41 is disposed at one end in the stacking direction as a termination electrode. The current collector 51 of the negative electrode 42 is disposed at the other end in the stacking direction as a terminal electrode.

The current collector 51 is a chemically inert electrical conductor for continuing to flow a current through the positive electrode active material layer 52 and the negative electrode active material layer 53 during discharging or charging of the lithium ion secondary battery. As a material forming the current collector 51, for example, a metal material, a conductive resin material, a conductive inorganic material, or the like can be used. Examples of the conductive resin material include a resin obtained by adding a conductive filler to a conductive polymer material or a non-conductive polymer material as needed and the like. The current collector 51 may include a plurality of layers that include one or more layers including the above-mentioned metal material or conductive resin material. A coating layer may be formed on the surface of the current collector 51 by a known method such as plating or spray coating. The current collector 51 may be formed in, for example, a plate shape, a foil shape, a sheet shape, a film shape, a mesh shape, or the like. In a case where the current collector 51 is made as a metal foil, the current collector 51 is, for example, the same as the electrode plate 21 of the first embodiment. In a case where a stainless steel foil is used as the current collector 51, a mechanical strength of the current collector 51 can be ensured. The current collector 51 may be an alloy foil or a clad foil containing the metal of the electrode plate 21. The current collector 51 of the positive electrode 41 is an aluminum foil, and the current collector 51 of the negative electrode 42 is a copper foil. In a case where the foil-shaped current collector 51 is used, its thickness may be, for example, 1 μm to 100 μm.

The positive electrode active material layer 52 contains a positive electrode active material that can occlude and release charge carriers such as lithium ions. As the positive electrode active material, a material that can be used as a positive electrode active material for a lithium ion secondary battery such as a lithium composite metal oxide having a layered rock salt structure, a metal oxide having a spinel structure, and a polyanionic compound only has to be adopted. Further, two or more kinds of positive electrode active materials may be used in combination. The positive electrode active material layer 52 contains olivine-type lithium iron phosphate ($LiFePO_4$) as a composite oxide.

The negative electrode active material layer 53 can be used without particular limitation as long as it is a simple substance, an alloy, or a compound that can occlude and release charge carriers such as lithium ions. For example, examples of the negative electrode active material include Li, carbon, a metal compound, an element that can be alloyed with lithium, or a compound thereof. Examples of the carbon include natural graphite, artificial graphite, hard carbon (non-graphitizable carbon), or soft carbon (easy graphitizable carbon).

Examples of the artificial graphite include highly oriented graphite, mesocarbon microbeads, and the like. Examples of the element that can be alloyed with lithium include silicon and tin. The negative electrode active material layer 53 contains graphite as a carbon-based material.

Each of the positive electrode active material layer 52 and the negative electrode active material layer 53 (hereinafter also simply referred to as an "active material layer") can further contain a conductive auxiliary agent for increasing electrical conductivity, a binder, an electrolyte (a polymer matrix, an ion conductive polymer, an electrolytic solution, or the like), an electrolyte supporting salt (a lithium salt) for increasing ionic conductivity, and the like as needed. Components contained in the active material layer, a compounding ratio of the components, and a thickness of the active material layer are not particularly limited, and conventionally known findings regarding a lithium ion secondary battery can be appropriately referred to. The thickness of the active material layer is, for example, 2 to 150 μm. In order to form the active material layer on the surface of the current collector 51, a conventionally known method such as a roll coating method may be used. In order to improve the thermal stability of the positive electrode 41 or the negative electrode 42, a heat resistant layer may be provided on the surface (one side or both sides) of the current collector 51 or the surface of the active material layer. The heat resistant layer may contain, for example, inorganic particles and a binder and may also contain an additive such as a thickener in addition thereto.

The conductive auxiliary agent is added to increase the conductivity of the positive electrode 41 or the negative electrode 42. The conductive auxiliary agent is the same as the conductive auxiliary agent of the first embodiment. The binder is the same as the binder of the first embodiment.

The separator 43 is a member that is disposed between the positive electrode active material layer 52 of the positive electrode 41 and the negative electrode active material layer 53 of the negative electrode 42 and separates the positive electrode 41 and the negative electrode 42 from each other to prevent short circuits due to contact between the two electrodes while charge carriers such as lithium ions are allowed to pass therethrough. The separator 43 prevents a short circuit between the bipolar electrodes adjacent to each other when the power storage cells 46 are stacked.

The separator 43 is configured to include a base material layer 55. The base material layer 55 may be, for example, a porous sheet or a non-woven fabric containing a polymer that absorbs and retains an electrolyte. Examples of a material forming the base material layer 55 include polypropylene, polyethylene, polyolefin, polyester, and the like. The base material layer 55 may have a single-layer structure or a multi-layer structure. The multi-layer structure may have, for example, an adhesive layer, a ceramic layer as a heat resistant layer, and the like. The base material layer 55 may be impregnated with an electrolyte, or the base material layer 55 itself may be formed of an electrolyte such as a polymer electrolyte or an inorganic type electrolyte.

Examples of the electrolyte impregnated in the base material layer 55 include a liquid electrolyte (an electrolytic solution) containing a non-aqueous solvent and an electrolyte salt dissolved in the non-aqueous solvent, a polymer gel electrolyte containing an electrolyte held in a polymer matrix, and the like.

In a case where the base material layer 55 is impregnated with the electrolytic solution, known lithium salts such as $LiClO_4$, $LiAsF_6$, $LiPF_6$, $LiBF_4$, $LiCF_3SO_3$, $LiN(FSO_2)_2$, and $LiN(CF_3SO_2)_2$ can be used as the electrolyte salt. Further, as the non-aqueous solvent, known solvents such as cyclic carbonates, cyclic esters, chain carbonates, chain esters, ethers, and the like can be used. In addition, two or more kinds of these known solvent materials may be used in combination.

The spacer 44 is formed between the current collector 51 of the positive electrode 41 and the current collector 51 of the negative electrode 42 and is joined or fixed to at least one of the current collector 51 of the positive electrode 41 and the current collector 51 of the negative electrode 42 (for example, both the current collector 51 of the positive electrode 41 and the current collector 51 of the negative electrode 42, or only any one of the current collector 51 of the positive electrode 41 and the current collector 51 of the negative electrode 42). The spacer 44 contains an insulating material and insulates the current collector 51 of the positive electrode 41 and the current collector 51 of the negative electrode 42 from each other to prevent a short circuit between the two current collectors. As a material forming the spacer 44, for example, various resin materials such as polyethylene (PE), polystyrene (PS), modified polypropylene (modified PP), ABS resin, and AS resin are used.

The spacer 44 extends along an edge portion 51e of the current collector 51 and is formed in a rectangular frame shape in a plan view so as to surround the periphery of the positive electrode active material layer 52 or the negative electrode active material layer 53 formed in a rectangular shape in a plan view. The edge portion 43a of the separator 43 may be embedded in the spacer 44.

The spacer 44 disposed in each power storage cell 46 has a portion disposed between the pair of current collectors 51 and a portion extending outward from the edge portion 51e of the current collector 51, and the portions of the spacers 44 adjacent to each other in the stacking direction of the cell stack 500 extending outward are joined to and integrated with each other. A plurality of spacers 44 are integrated with each other to form a sealed body 44a. The separator 43 and the electrolyte (the electrolytic solution) are accommodated in the space S2 surrounded by the spacer 44, the positive electrode 41, and the negative electrode 42. The spacer 44 which has a rectangular frame shape in a plan view is joined and fixed to the edge portion 51e of the current collector 51.

The sealed body 44a formed by integrating the plurality of spacers 44 has a tubular portion extending in the stacking direction from the current collector 51 disposed at one end of the cell stack 500 in the stacking direction to the current collector 51 disposed at the other end of the cell stack 500 in the stacking direction. As a method for joining the spacers 44 adjacent to each other, for example, a known welding method such as heat welding, ultrasonic welding, or infrared welding is used.

The spacer 44 also functions as a sealing part for sealing the space S2 between the positive electrode 41 and the negative electrode 42 and can prevent the electrolyte accommodated in the space S2 from permeating to the outside. Further, the spacer 44 can prevent moisture from entering the space S2 from the outside of the power storage module 400. Further, the spacer 44 can prevent a gas generated from the positive electrode 41 or the negative electrode 42 due to, for example, a charge and discharge reaction from leaking to the outside of the power storage module 400.

A conductive layer 45 may be further disposed on the second surface 51b of the current collector 51 disposed on the outermost side of the cell stack 500 in the stacking direction for the purpose of improving the conductive contact with the negative electrode current collecting plate 13 or the positive electrode current collecting plate 12. In this case, the conductive layer 45 may be in close contact with the second surface 51b of the current collector 51.

The conductive layer 45 has a hardness lower than, for example, a hardness of the current collector 51. The conductive layer 45 may be a layer containing carbon such as acetylene black or graphite, or may be a plated layer containing Au.

Figure 11:
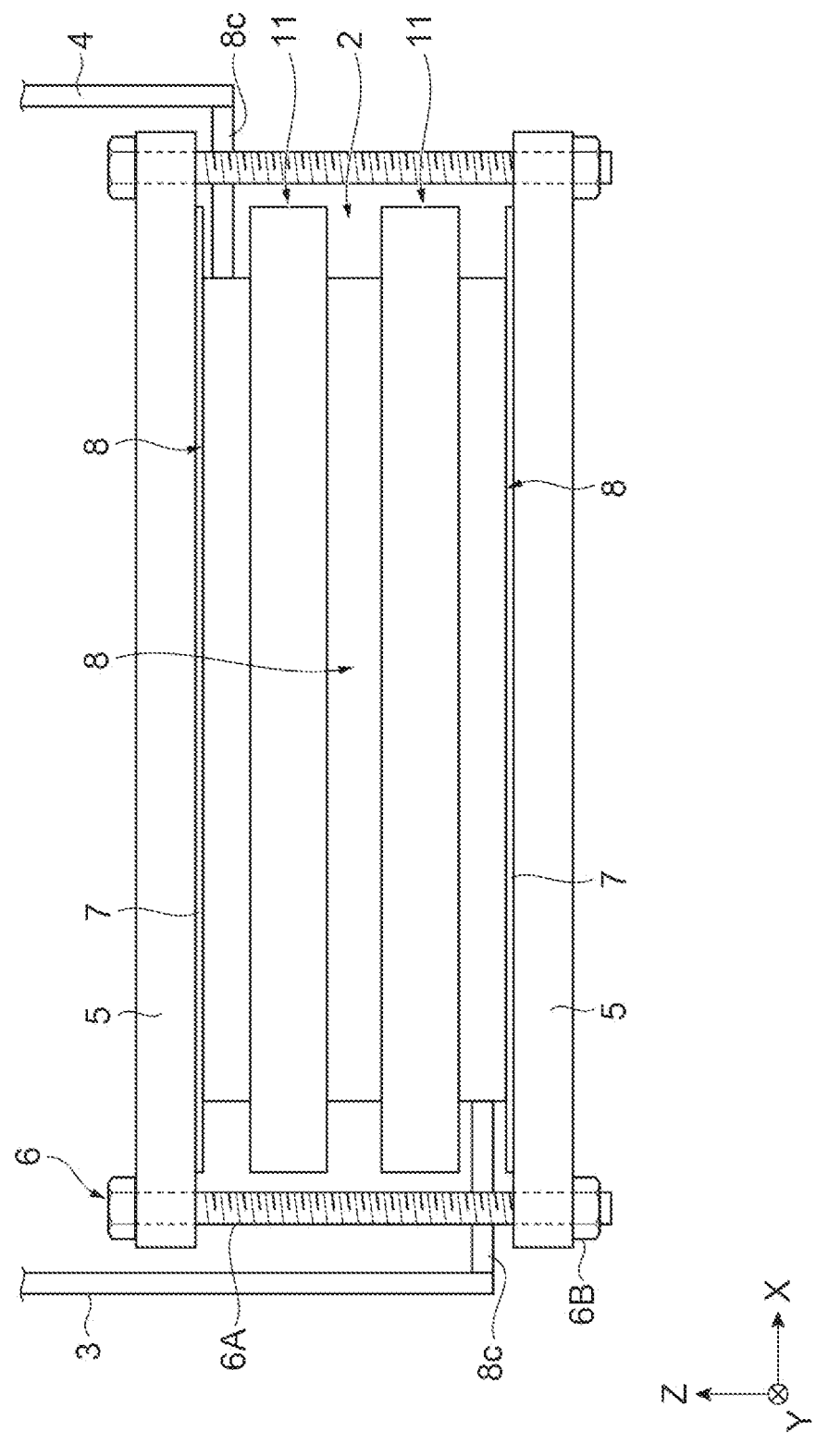
FIG. 11 is a schematic side view showing a power storage device according to a modification example.

Further, in the first embodiment, the two power storage modules 11 are disposed such that the positive electrode termination electrodes 18 face each other, and the positive electrode current collecting plate 12 is disposed so as to be in contact with the two positive electrode termination electrodes 18 facing each other. That is, the two power storage modules 11 are stacked so as to be connected in parallel. However, as shown in FIG. 11, the plurality of (here, two) power storage modules 11 may be disposed such that the positive electrode termination electrode 18 (see FIG. 2) and the negative electrode termination electrode 19 (see FIG. 2) face each other. In this case, the current collecting plates 8 is disposed between the power storage modules 11 adjacent to each other and at both ends of the stacked body 2 in the stacking direction. That is, the plurality of power storage modules 11 are stacked so as to be connected in parallel. The connecting member 3 is electrically connected to the protruding portion 8c of the current collecting plate (the current collecting plate in contact with the positive electrode termination electrode) 8 at the other end of the stacked body 2 in the stacking direction. The connecting member 4 is electrically connected to the protruding portion 8c of the current collecting plate (the current collecting plate in contact with the negative electrode termination electrode) 8 at one end of the stacked body 2 in the stacking direction. Similarly, in the second embodiment, the plurality of power storage modules 110 may be disposed such that the positive electrode termination electrode 280 (see FIG. 4) and the negative electrode termination electrode 290 (see FIG. 4) face each other.

Further, in the first embodiment, the intermediate member 7 has an insulation property and is responsible for insulating between the stacked body 2 and the restraint plate 5. However, by an insulating member other than the intermediate member 7 being interposed between the stacked body 2 and the restraint plate, the intermediate member 7 may be configured not to have an insulation property.

Further, in the first embodiment, the power storage device 1A may not include any one of the adhesive layer 73 and the adhesive layer 74. That is, the power storage device 1A only has to include at least one of the adhesive layer 73 and the adhesive layer 74.

Further, as described above, in the first embodiment, according to the intermediate member 7, a certain deformation of the restraint plate 5 is allowed when a uniform restraint load is applied to the power storage module 11. Therefore, for example, a cushioning member may be provided at the corners or the like of the stacked body 2 in consideration of contact with the deformed restraint plate 5.

Further, in the second embodiment, the damper 80 may be in contact with the current collecting plate 120 in addition to being in contact with the power storage module 110 and the heat exchanger 130. The damper 80 may further extend in the stacking direction of the power storage module 110 to be in contact with at least one of the upper and lower heat exchangers 130 and 130 in addition to being in contact with the central heat exchanger 130. The damper 80 is preferably interposed between the entire stacked body 30 and the inner surface 20a of the case 20. The damper 80 may be interposed between a part of the stacked body 30 and the inner surface 20a.

Further, in the second embodiment, the electrolyte applied to the power storage module 110 may not necessarily be a liquid electrolyte (an electrolytic solution). The electrolyte may be a solid state electrolyte, or may be a semi-solid state (gel-state) electrolyte impregnated in a separator made of a non-woven fabric or the like. Further, the sealing part 220 may not necessarily seal the side surface portion of the electrode stacked body 210 without a gap such that the electrode stacked body 210 is not in contact with the outside air. For example, when the electrolyte is a solid state electrolyte or a semi-solid state (gel-state) electrolyte, the sealing may be performed such that the electrolyte does not leak.

Further, in the second embodiment, in a case where the ignition inhibitor has a shock absorbing property, the package 31 may be filled with only the ignition inhibitor 33 as the shock absorbing material 32. The ignition inhibitor 33 in this case may be any one of a gas, a liquid, or a solid (a powder).

Further, in the second embodiment, as in the first embodiment, the power storage device 1B may include the power storage module 400 instead of the power storage module 110.

Further, in the first embodiment and the second embodiment, the power storage device 1A, 1B may include one power storage module 11, 110 instead of the plurality of power storage modules 11, 110.

Further, in the second embodiment, the damper 80 may not be interposed between the side surface 30a of the stacked body 30 and the inner surface 20a of the case 20.

Further, in the second embodiment, the restraint load may not be applied to the stacked body 30 via the bottom wall portion 50b and the lid portion 60 by reducing a pressure inside the case 20 with respect to the atmospheric pressure. For example, the restraint load may be applied to the stacked body 30 via the bottom wall portion 50b and the lid portion 60 by a fastening force of a plurality of bolts and nuts for fastening the flange 50d of the main body portion 50 and the lid portion 60.

Further, in the second embodiment, the lid portion 60 of the main body portion 50 may not be constituted by the panel member of the vehicle. The lid portion 60 may be constituted by a panel member different from the panel member of the vehicle.

Further, in the first embodiment and the second embodiment, a plurality of power storage modules 11 and 110 may be arranged in an in-plane direction in which they intersect with each other in the stacking direction.

REFERENCE SIGNS LIST 1A, 1B Power storage device
2, 30 Stacked body (modular structure)
5 Restraint plate (restraint member)
6 Fastening member
7, 140 Intermediate member (first intermediate member)
8 Current collecting plate
11, 110 Power storage module
12 Positive electrode current collecting plate (current collecting plate)
13 Negative electrode current collecting plate (current collecting plate)
14, 210 Stacked body (electrode stacked body)
14s Side surface
15 Sealing member
16, 230 Bipolar electrode
17 Separator
18, 280 Positive electrode termination electrode
19, 290 Negative electrode termination electrode
20 Case
20a Inner surface
21 Electrode plate (current collector)
22 Positive electrode layer
23 Negative electrode layer
30a Side surface
31 Package (second package)
32 Shock absorbing material
33 Ignition inhibitor
34 Pressure release valve
50 Main body portion
50a Opening portion
50b Bottom wall portion (restraint member)
50c Side wall portion (wall portion)
60 Lid portion (restraint member)
71 Package (first package)
72 Fluid
73 Adhesive layer (second adhesive layer)
74 Adhesive layer (first adhesive layer)
80 Damper (second intermediate member)
120 Current collecting plate
130 Heat exchanger
220 Sealing part (sealing member)
250 Metal foil (current collector)
260 Positive electrode active material layer (positive electrode layer)
270 Negative electrode active material layer (negative electrode layer)
25 Seal member

The invention claimed is:

1. A power storage device comprising:
a modular structure including at least one power storage module, the power storage module having an electrode stacked body and a sealing member, the electrode stacked body having a plurality of bipolar electrodes, the plurality of bipolar electrodes each including a current collector, a positive electrode layer provided on one main surface of the current collector, and a negative electrode layer provided on the other main surface of the current collector and being stacked in a first direction, and the sealing member sealing a side surface of the electrode stacked body along the first direction;
a pair of restraint members disposed at a first end and a second end of the modular structure in the first direction to apply a restraint load to the modular structure;
a first intermediate member interposed between each of the pair of restraint members and the modular structure to transmit the restraint load from the restraint member to the modular structure;
a case configured to accommodate the modular structure; and
a second intermediate member interposed between the side surface of the modular structure extending in the first direction and an inner surface of the main body portion of the case,
wherein the modular structure further includes a current collecting plate that constitutes the first end of the modular structure in the first direction and is electrically connected to the electrode stacked body,
wherein the first intermediate member is interposed between the restraint member and the current collecting plate, and
wherein the first intermediate member includes a first package that is deformable according to the restraint load and a fluid that is enclosed in the first package,
wherein the first intermediate member is a resin package sealing a gas, a liquid, a gel, or a mixture thereof inside of the resin package,
wherein the case has a bottomed box-shaped main body portion provided with an opening portion that is open in the first direction and a lid portion that closes the opening portion,
wherein the pair of restraint members are constituted by a bottom wall portion of the main body portion facing the opening portion in the first direction and the lid portion,
wherein the second intermediate member is constituted by a second package that can be expanded according to filling with contents and a shock absorbing material filled in the second package, and
wherein the second package comprises one of polyolefin resin and a laminated film comprising metal.

2. The power storage device according to claim 1, wherein an outer edge of the first intermediate member is located outside an outer edge of the current collecting plate when viewed in the first direction.

3. The power storage device according to claim 2, wherein, in the first end of the modular structure, the sealing member is disposed outside the current collecting plate to surround the current collecting plate when viewed in the first direction, and
wherein the first intermediate member is disposed from the current collecting plate to the sealing member.

4. The power storage device according to claim 3, wherein the outer edge of the first intermediate member is located outside an outer edge of the sealing member disposed outside the current collecting plate when viewed in the first direction.

5. The power storage device according to claim 1, wherein an outer edge of the first intermediate member is located inside an outer edge of the current collecting plate when viewed in the first direction.

6. The power storage device according to claim 1, further comprising at least one of a first adhesive layer disposed between the first intermediate member and the modular structure to adhere the first intermediate member and the modular structure to each other and a second adhesive layer disposed between the first intermediate member and the restraint member to adhere the first intermediate member and the restraint member to each other.

7. The power storage device according to claim 1, further comprising a seal member provided between the first intermediate member and the modular structure along an outer edge of the first intermediate member or an outer edge of the modular structure.

8. The power storage device according to claim 1, further comprising a fastening member for applying the restraint load to the modular structure via the restraint members by fastening the restraint members to each other.

9. The power storage device according to claim 1, wherein the restraint load is applied to the modular structure via the bottom wall portion and the lid portion by reducing a pressure inside the case with respect to atmospheric pressure.

10. The power storage device according to claim 1, wherein the lid portion is constituted by a panel member of a vehicle.

11. The power storage device according to claim 1, wherein the modular structure includes a plurality of the power storage modules stacked in the first direction and a heat exchanger disposed between the power storage modules adjacent to each other in the first direction, and
wherein the second intermediate member is interposed between at least the power storage module and the heat exchanger, and the inner surface of the main body portion.

12. The power storage device according to claim 1, wherein the second package is made of a material having an electrical insulation property.

13. The power storage device according to claim 1, wherein the case is a case for airtightly accommodating the modular structure, and
wherein, in the case, a wall portion constituting the inner surface is provided with a pressure release valve at a position not in contact with the second intermediate member.

14. The power storage device according to claim 1, wherein the second package is made of a material that can be broken by a gas generated from the power storage module when the power storage module deteriorates or is abnormal, and
wherein the second package is filled with an ignition inhibitor together with the shock absorbing material.

15. A power storage device comprising:
a modular structure including at least one power storage module, the power storage module having an electrode stacked body and a sealing member, the electrode stacked body having a plurality of bipolar electrodes, the plurality of bipolar electrodes each including a current collector, a positive electrode layer provided on one main surface of the current collector, and a negative electrode layer provided on the other main surface of the current collector and being stacked in a first direction, and the sealing member sealing a side surface of the electrode stacked body along the first direction;
a pair of restraint members disposed at a first end and a second end of the modular structure in the first direction to apply a restraint load to the modular structure;
a first intermediate member interposed between each of the pair of restraint members and the modular structure to transmit the restraint load from the restraint member to the modular structure; and a case configured to accommodate the modular structure and the first intermediate member, wherein the modular structure further includes a current collecting plate that constitutes the first end of the modular structure in the first direction and is electrically connected to the electrode stacked body, wherein the first intermediate member is interposed between the restraint member and the current collecting plate, and wherein the first intermediate member comprises a first package that is deformable according to the restraint load and a fluid that is enclosed in the first package, wherein the case comprises a bottomed box-shaped main body portion provided with an opening portion that is open in the first direction and a lid portion configured to air-tightly be fixed to the main body portion via the sealing member and close the opening portion, wherein a bottom wall portion of the main body portion facing the opening portion in the first direction and the lid portion form the pair of restraint members configured to apply a restraint load to the modular structure by being disposed at the first end and the second end of the module structure in the first direction, wherein a pressure inside of the case is in a decompressed state with respect to an atmospheric pressure outside of the case, and the pair of restraint members are configured to apply the restraint load to the module structure based on a pressure difference between the pressure inside of the case and the atmospheric pressure outside of the case.

* * * * *